US010368083B2

(12) United States Patent
Chien et al.

(10) Patent No.: US 10,368,083 B2
(45) Date of Patent: Jul. 30, 2019

(54) PICTURE ORDER COUNT BASED MOTION VECTOR PRUNING

(71) Applicant: QUALCOMM Incorporated, San Diego, CA (US)

(72) Inventors: Wei-Jung Chien, San Diego, CA (US); Sungwon Lee, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 15/431,321

(22) Filed: Feb. 13, 2017

(65) Prior Publication Data

US 2017/0238005 A1 Aug. 17, 2017

Related U.S. Application Data

(60) Provisional application No. 62/295,450, filed on Feb. 15, 2016.

(51) Int. Cl.
*H04N 19/00* (2014.01)
*H04N 19/513* (2014.01)
(Continued)

(52) U.S. Cl.
CPC ......... *H04N 19/513* (2014.11); *H04N 19/139* (2014.11); *H04N 19/172* (2014.11);
(Continued)

(58) Field of Classification Search
CPC ...... H04N 7/26; H04N 19/513; H04N 19/573; H04N 19/51; H04N 19/0003; H04N 19/52;
(Continued)

(56) References Cited

U.S. PATENT DOCUMENTS 8,494,042 B2 * 7/2013 Park ..................... H04N 19/103
345/530
2009/0304084 A1 * 12/2009 Hallapuro .............. H04N 19/52
375/240.16
(Continued)

OTHER PUBLICATIONS

Second Written Opinion from International Application No. PCT/US2017/017827, dated Jan. 2, 2018, 5 pp.
(Continued)

*Primary Examiner* — Frank F Huang
(74) *Attorney, Agent, or Firm* — Shumaker & Sieffert, P.A.

(57) ABSTRACT

In general, this disclosure described techniques for pruning a list of motion vector prediction candidates based on picture order count (POC) values. A video coding device may be configured to generate the list of motion vector prediction candidates for a prediction unit (PU) of video data. The video coding device may prune a first motion vector prediction candidate from the list of motion vector prediction candidates when a POC value for a reference picture identified by the first motion vector prediction candidate is equal to a second POC value of a reference picture identified by a second motion vector prediction candidate in the list of motion vector prediction candidates. The video coding device may code the PU using the pruned list.

16 Claims, 13 Drawing Sheets

(51) Int. Cl.
| | |
|---|---|
| H04N 19/573 | (2014.01) |
| H04N 19/172 | (2014.01) |
| H04N 19/70 | (2014.01) |
| H04N 19/94 | (2014.01) |
| H04N 19/52 | (2014.01) |
| H04N 19/139 | (2014.01) |
| H04N 19/176 | (2014.01) |
| H04N 19/196 | (2014.01) |

(52) U.S. Cl.
CPC ......... *H04N 19/176* (2014.11); *H04N 19/196* (2014.11); *H04N 19/52* (2014.11); *H04N 19/573* (2014.11); *H04N 19/70* (2014.11); *H04N 19/94* (2014.11)

(58) Field of Classification Search
CPC .. H04N 19/503; H04N 19/436; H04N 19/107; H04N 19/44; H04N 19/43; H04N 19/593
See application file for complete search history.

(56) References Cited

U.S. PATENT DOCUMENTS

| 2013/0155184 A1* | 6/2013 | Chen | H04N 19/597 348/43 |
| 2013/0279576 A1* | 10/2013 | Chen | H04N 19/597 375/240.12 |
| 2014/0321544 A1* | 10/2014 | Laroche | H04N 19/0003 375/240.13 |

OTHER PUBLICATIONS

International Preliminary Report on Patentability from International Application No. PCT/US2017/017827, dated Apr. 20, 2018, 8 pp.
Chien et al., "Modification of merge candidate derivation," 2. JVET Meeting, Feb. 20, 2016-Feb. 26, 2016, San Diego, (The Joint Video Exploration Team of ISO/IEC JTC1/SC29/WG11 and ITU-TSG.16 ), No. JVET-B0058-v4, Feb. 23, 2016, URL: http://PHENIX.INT-EVRY.FR/JVET/, 8 pp.
International Search Report and Written Opinion of International Application No. PCT/US2017/017827, dated Apr. 26, 2017, 15 pp.
Richardson, "Chapter 6: H264/MPEG4 Part 10," H.264 and MPEG-4 Video Compression, Oct. 17, 2003, pp. 159-223.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.263, Series H: Audiovisual and Multimedia Systems, Infrastructure of audiovisual services—Coding of moving video, Video coding for low bit rate communication, The International Telecommunication Union. Jan. 2005, 226 pp.
Bross B., et al., "High Efficiency Video Coding (HEVC) text specification draft 10 (for FDIS & Last Call)," Joint Collaborative Team on Video Coding (JCT-VC) of ITU-T SG16 WP3 and ISO/IEC JTC1/SC29/WG11 12th Meeting: Geneva, CH, Jan. 14-23, 2013, JCTVC-L1003_34, Mar. 19, 2013, 310 pp.
ITU-T Rec. H.261 (Dec. 1990), "Line Transmission on Non-Telephone Signals, Video Codec for Audiovisual Services AT p x 64 kbit/s," Dec. 1990, 32 pp.
ITU-T H.223, Series H: Audiovisual and Multimedia Systems, Infrastructure of audiovisual services—Transmission multiplexing and synchronization, Multiplexing protocol for low bit rate multimedia communication, The International Telecommunication Union, Jul. 2001, 74 pp.
Zhang L., et al., "Test Model 6 of 3D-HEVC and MV-HEVC," International Organisation for Standardisation Internationale De Normalisation ISO/IEC JTC1/SC29/WG11 Coding of Moving Pictures and Audio, ISO/IEC JTC1/SC29/WG11 N13940, Nov. 2013, Geneva, Switzerland, 52 pp.
Chen J., et al., "Algorithm Description of Joint Exploration Test Model 1," Joint Video Exploration Team (JVET) of ITU-T SG16 WP3 and ISO/IEC JTC1/SC29/WG11 1nd Meeting: Geneva, CH, Oct. 19-21, 2015, JVET-A1001, 27 pp.
Chien W-J., et al., "Modification of merge candidates derivation," Joint Video Exploration Team (JVET) of ITU-T SG16 WP3 and ISO/IEC JTC1/SC29/WG11 2nd Meeting: San Diego, USA, Feb. 20-26, 2016, JVET-B0058, 5 pp.
ITU-T H.264, Series H: Audiovisual and Multimedia Systems, Infrastructure of audiovisual services—Coding of moving video, Advanced video coding for generic audiovisual services, Mar. 2010, 674 pp.
Lee S., et al., "EE2.6: Modification of Merge candidate derivation: ATMVP simplification and Merge pruning," Joint Video Exploration Team (JVET) of ITU-T SG16 WP3 and ISO/IEC JTC1/SC29/WG11 3rd Meeting: Geneva, CH, May 26-Jun. 1, 2016, JVET-O0035, 4 pp.
Chiariglione L., "Meeting Report, the 114th SC29/WG11 Meeting, Feb. 22/26, 2016, San Diego, USA [SC29/WG11N15906]," Convener, ISO/IEC JTC1/SC29/WG11, N 15908, Jun. 3, 2016, 421 pp.
ITU-T Rec. H.262 (Jul. 1995), "Transmission of Non-Telephone Signals, Information Technology—Generic Coding of Moving Pictures and Associated Audio Information: Video," Jul. 1995, 211 pp.
Chen J. et al., "Coding tools investigation for next generation video coding," Study Group 16—Contribution 806, International Telecommunication Union, Study Period 2013-2016, Jan. 2015, 7 pp.
Qualcomm, "Extension of Advanced Temporal Motion Vector Predictor (ATMVP)," ITU Telecommunication Standardization Sector Study Group 16 Question 6 Video Coding Experts Group (VCEG) 52nd Meeting, Jun. 19-26, 2015, Warsaw, Poland, VCEG-AZ10, 4 pp.
U.S. Appl. No. 14/497,128, filed by Ying Chen, filed Sep. 25, 2014.
U.S. Appl. No. 15/005,564, filed by Ying Chen, filed Jan. 25, 2016.
U.S. Appl. No. 15/176,790, filed by Wei-Jung Chien, filed Jan. 8, 2016.
Response to Written Opinion dated Apr. 26, 2017, from International Application No. PCT/US2017/017827, filed on Aug. 24, 2017, 5 pp.

* cited by examiner

PICTURE ORDER COUNT BASED MOTION VECTOR PRUNING

This application claims the benefit of U.S. Provisional Application No. 62/295,450 filed Feb. 15, 2016, the entire contents of which are incorporated herein.

TECHNICAL FIELD

The disclosure relates to video coding.

BACKGROUND

Digital video capabilities may be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which for some techniques may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure described techniques for pruning a list of motion vector prediction candidates based on picture order count (POC) values. A video coding device may be configured to generate the list of motion vector prediction candidates for a prediction unit (PU) of video data. The video coding device may prune a first motion vector prediction candidate from the list of motion vector prediction candidates when a POC value for a reference picture identified by the first motion vector prediction candidate is equal to a second POC value of a reference picture identified by a second motion vector prediction candidate in the list of motion vector prediction candidates. The video coding device may code the PU using the pruned list.

In one example, a method of decoding video data includes generating a list of motion vector prediction candidates for a prediction unit (PU) of video data; pruning a first motion vector prediction candidate from the list of motion vector prediction candidates when a first picture order count (POC) value for a reference picture identified by the first motion vector prediction candidate is equal to a second POC value of a reference picture identified by a second motion vector prediction candidate in the list of motion vector prediction candidates; and decoding the PU using the pruned list.

In another example, a video coding device includes a memory configured to store video data; and one or more processors configured to: generate a list of motion vector prediction candidates for a prediction unit (PU) of video data; prune a first motion vector prediction candidate from the list of motion vector prediction candidates when a first picture order count (POC) value for a reference picture identified by the first motion vector prediction candidate is equal to a second POC value of a reference picture identified by a second motion vector prediction candidate in the list of motion vector prediction candidates; and code the PU using the pruned list.

In another example, a computer-readable storage medium has stored thereon instructions that, when executed, cause one or more processors of a video coding device to: generate a list of motion vector prediction candidates for a prediction unit (PU) of video data; prune a first motion vector prediction candidate from the list of motion vector prediction candidates when a first picture order count (POC) value for a reference picture identified by the first motion vector prediction candidate is equal to a second POC value of a reference picture identified by a second motion vector prediction candidate in the list of motion vector prediction candidates; and code the PU using the pruned list.

In another example, an apparatus for decoding video data includes means for generating a list of motion vector prediction candidates for a prediction unit (PU) of video data. The apparatus also includes means for pruning a first motion vector prediction candidate from the list of motion vector prediction candidates when a first picture order count (POC) value for a reference picture identified by the first motion vector prediction candidate is equal to a second POC value of a reference picture identified by a second motion vector prediction candidate in the list of motion vector prediction candidates. The apparatus further includes means for decoding the PU using the pruned list.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 10A and 10B are conceptual diagrams illustrating examples of sub-PUs of a PU, as well as neighboring sub-PUs to the PU.

DETAILED DESCRIPTION

In general, this disclosure is related to motion vector prediction in video codecs (that is, video coders, such as video encoders and video decoders). More specifically, motion vector prediction includes pruning motion vector prediction candidates from consideration based on multiple motion vector prediction candidates having, e.g., the same picture order count (POC) value and/or motion vector values. To maximize the efficiency of motion vector (MV) prediction, uniqueness of available motion vector prediction candidates may be examined. Otherwise, redundant motion vector prediction candidates would lead to inefficient resource utilization such as wasting a bit budget or resources of target devices. Thus, eliminating the redundancy of motion vector prediction candidates, through pruning the motion vector prediction candidates, may enhance uniqueness and diversity of the list of potential motion vector prediction candidates to provide more meaningful motion vector prediction candidates for MV prediction. Such techniques may be applied to merge mode and/or advanced motion vector prediction (AMVP) mode.

Techniques described herein include a picture order count (POC) based pruning technique. The techniques described herein may enhance pruning accuracy, because the techniques enable a video coding device to detect redundant motion vector prediction candidates not captured by existing pruning methods. In addition, no additional overhead (e.g., the addition of metadata or syntax elements) may be required to implement the techniques of this disclosure, relative to, e.g., ITU-T H.265/High Efficiency Video Coding (HEVC). Lastly, POC-based pruning may be universal in the sense that these techniques may be applied to versatile situations, e.g. spatial MVs for ATMVP/merge candidates, sub-PU (ATMVP and STMVP) MVs, TMVP, combined MV, and even zero MV.

Figure 1:
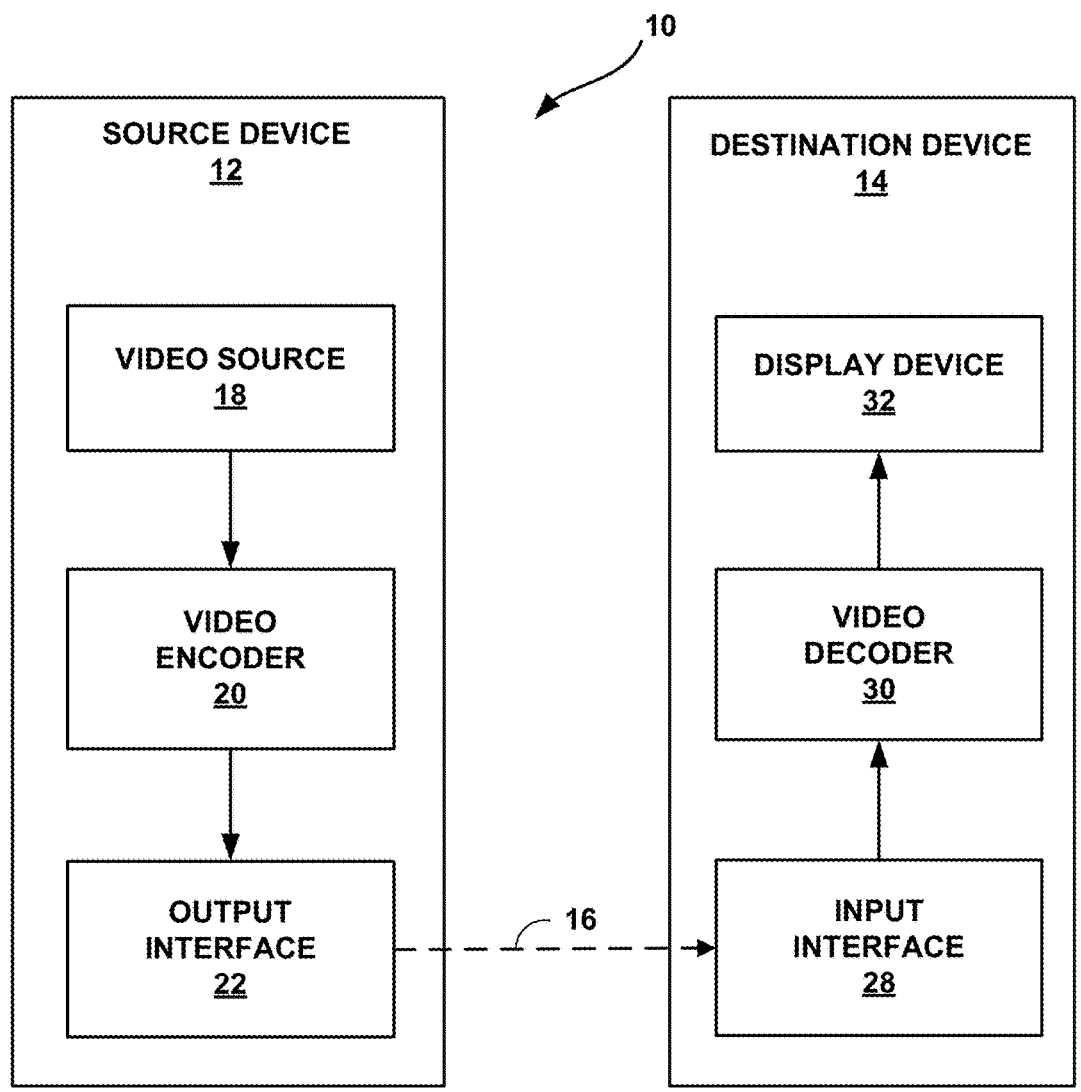
FIG. 1 is a block diagram illustrating an example video encoding and decoding system that may utilize techniques for implementing pruning motion vectors based on picture order count values.

FIG. 1 is a block diagram illustrating an example video encoding and decoding system that may utilize techniques for implementing pruning motion vectors based on picture order count values. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for advanced temporal motion vector prediction (ATMVP). In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for advanced temporal motion vector prediction (ATMVP) may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, extensions to the HEVC standard, or subsequent standards, such as ITU-T H.266. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is a newly developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC is available from phenix.int-evry.fr/jct/doc_end_user/documents/12_Geneva/wg11/JCTVC-L1003-v34.zip. The HEVC standard is also presented jointly in Recommendation ITU-T H.265 and International Standard ISO/IEC 23008-2, both entitled "High efficiency video coding," and both published October, 2014.

For each block of video data, a set of motion information may be available. A set of motion information for a block contains motion information for forward and backward prediction directions. Here, forward and backward prediction directions are two prediction directions corresponding to reference picture list 0 (RefPicList0) and reference picture list 1 (RefPicList1) of a current picture or slice. The terms "forward" and "backward" do not necessarily have a geometry meaning. Instead, they are used to distinguish which reference picture list a motion vector is based on. Forward prediction means the prediction formed based on reference list 0, while backward prediction means the prediction formed based on reference list 1. In instances where both reference list 0 and reference list 1 are used to form a prediction for a given block, it is called bi-directional prediction.

For a given picture or slice, if only one reference picture list is used, every block inside the picture or slice is forward predicted. If both reference picture lists are used for a given picture or slice, a block inside the picture or slice may be forward predicted, or backward predicted, or bi-directionally predicted. For each prediction direction, the motion information contains a reference index and a motion vector. A reference index value is used to identify a reference picture in the corresponding reference picture list (e.g. RefPicList0 or RefPicList1). A motion vector has both a horizontal and a vertical component, with each indicating an offset value along horizontal and vertical direction respectively. In some descriptions, for simplicity, the word of "motion vector" may be used interchangeably with motion information, to indicate both the motion vector and its associated reference index.

Picture order count (POC) is widely used in video coding standards to identify a display order of a picture. Although there are cases in which two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction and derivation of a reference picture set as in HEVC and motion vector scaling.

In H.264/AVC, each inter macroblock (MB) may be partitioned into four different ways: One 16×16 MB partition, two 16×8 MB partitions, two 8×16 MB partitions, or four 8×8 MB partitions. Different MB partitions in one MB may have different reference index values for each direction (RefPicList0 or RefPicList1).

When an MB is not partitioned into four 8×8 MB partitions, the MB has only one motion vector for each MB partition in each direction. When an MB is partitioned into four 8×8 MB partitions, each 8×8 MB partition may be further partitioned into sub-blocks, each of which may have a different motion vector in each direction. There are four different ways to get sub-blocks from an 8×8 MB partition: One 8×8 sub-block, two 8×4 sub-blocks, two 4×8 sub-blocks, or four 4×4 sub-blocks. Each sub-block may have a different motion vector in each direction. Therefore, a motion vector is present in a level equal to or higher than the sub-block.

In AVC, temporal direct mode could be enabled in either MB or MB partition level for skip or direct mode in B slices. For each MB partition, the motion vectors of the block co-located with the current MB partition in the RefPicList1 [0] of the current block are used to derive the motion vectors. Each motion vector in the co-located block is scaled based on POC distances. In AVC, a direct mode may also predict motion information from the spatial neighbors.

In High Efficiency Video Coding (HEVC), the largest coding unit (CU) in a slice is called a coding tree block (CTB) or coding tree unit (CTU). A CTB contains a quad-tree, the nodes of which are coding units. The size of a CTB may range from 16×16 to 64×64 in the HEVC main profile (although technically 8×8 CTB sizes may be supported). A coding unit (CU) could be the same size of a CTB although and as small as 8×8. Each coding unit is coded with one mode. When a CU is inter coded, the CU may be further partitioned into 2 or 4 prediction units (PUs) or become just one PU when further partition doesn't apply. When two PUs are present in one CU, the PUs may be two equal sized rectangles (i.e., each PU is a rectangle with an area equal to half of the CU) or two rectangles with different sizes (i.e., one PU is a rectangle with an area equal to one quarter of the area of the CU and the other PU is a rectangle with an area equal to three quarters of the area of the CU). When the CU is inter coded, one set of motion information is present for each PU. In addition, each PU is coded with a unique inter-prediction mode to derive the set of motion information.

In HEVC standard, there are two general inter prediction modes: Merge mode (skip mode is considered a special case of merge mode) and advanced motion vector prediction (AMVP) modes, respectively, for a prediction unit (PU). In either AMVP or merge mode, a motion vector candidate list is maintained for multiple motion vector prediction candidates. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index may be explicitly signaled, together with an MVP index to the MV candidate list since the AMVP candidate contains only a motion vector. In AMVP mode, the predicted motion vectors may be further refined.

As may be seen above, a merge candidate corresponds to a full set of motion information while an AMVP candidate contains just one motion vector for a specific prediction direction and reference index. The candidates for both modes are derived similarly from the same spatial and temporal neighboring blocks.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HEVC HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, the CU is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU may be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, the TU may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that may be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

It is noted that in the following description, we use 'PU' to indicate the inter-coded block unit and sub-PU to indicate the unit that derives the motion information from neighboring blocks.

Video encoder 20 and video decoder 30 may apply any of the following methods alone or in any combination. In accordance with techniques of the current disclosure, video encoder 20 and video decoder 30 may be configured to code a motion vector. In coding the motion vector, video encoder 20 and video decoder 30 may be configured to generate a list of motion vector prediction candidates for a prediction unit (PU) of video data. Video encoder 20 and video decoder 30 may further be configured to prune a first motion vector prediction candidate from the list of motion vector prediction candidates when a first picture order count (POC) value for a reference picture identified by the first motion vector prediction candidate is equal to a second POC value of a reference picture identified by a second motion vector prediction candidate in the list of motion vector prediction candidates. Video encoder 20 and video decoder 30 may further be configured to code (e.g., encode or decode) the PU using the pruned list.

In general, existing MV pruning methods are categorized into at least (possibly more than) two categories: (1) pixel-based pruning and (2) motion-information-based pruning. The first method is a results-driven process but is accurate, comparing predicted pixels after motion compensation (MC). Pixel-based pruning may differentiate MVs based on the outcome of MC process, thus even completely different motion vector prediction candidates may be pruned if they point to the same predicted pixels. However, this approach is impractical due to extremely high complexity. The second method, as in HEVC, is to compare motion vector prediction candidates based on motion information such as prediction direction (InterDir), reference list (RefList), and reference index (RefIdx). If InterDir, RefList, and RefIdx of a MV, MV[0], is identical to those of another MV, MV[1], the motion-information-based pruning techniques assume that the MVs are the same MV if MV[0] is equal to MV[1]. However, this assumption is not necessarily true because reference lists, L0 and L1, sometimes have the same reference pictures, each having the same POC value.

Figure 12:
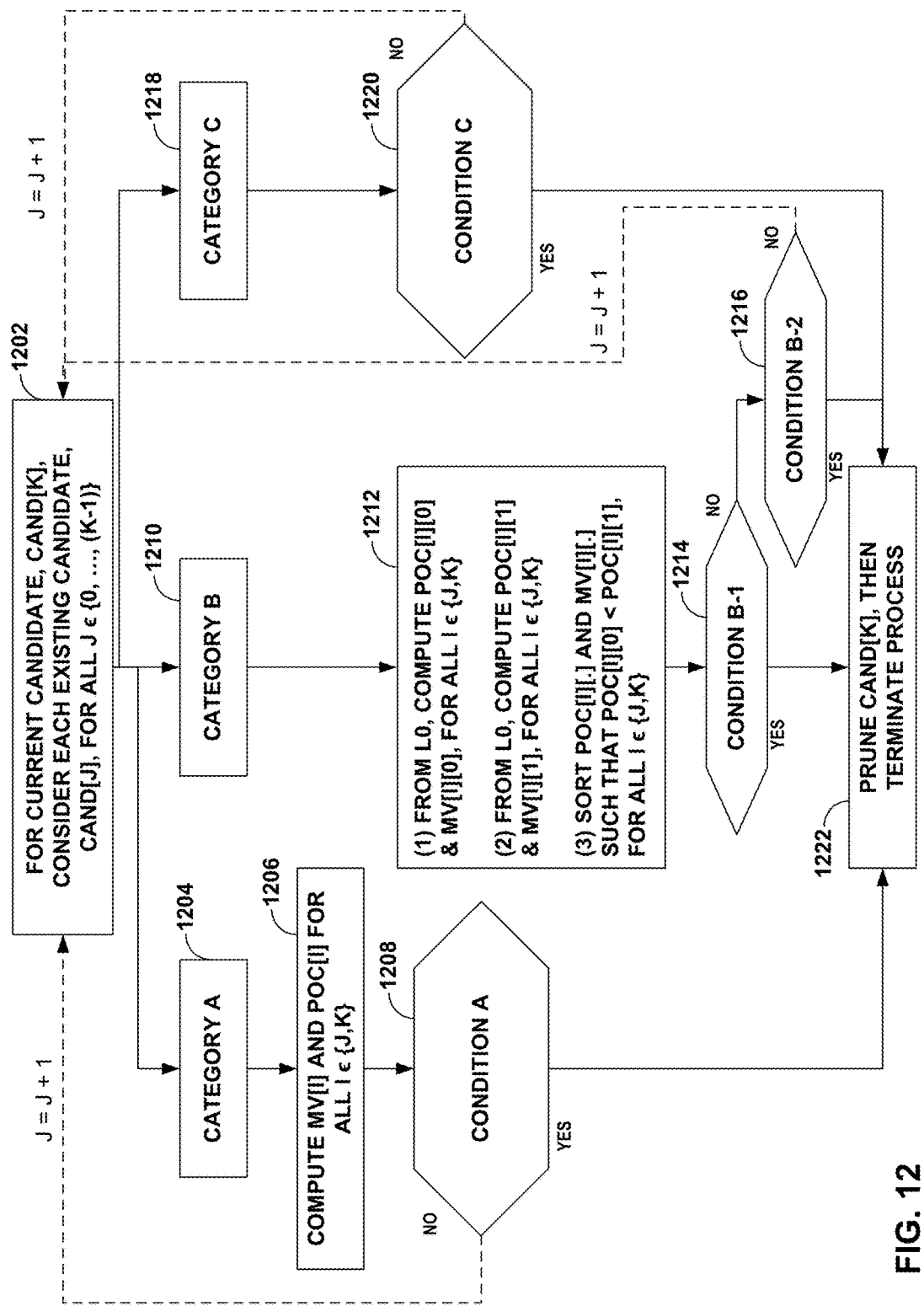
FIG. 12 is a flowchart illustrating conditions for pruning each of the three categories described in FIG. 11, in accordance with one or more techniques of the current disclosure.
Figure 13:
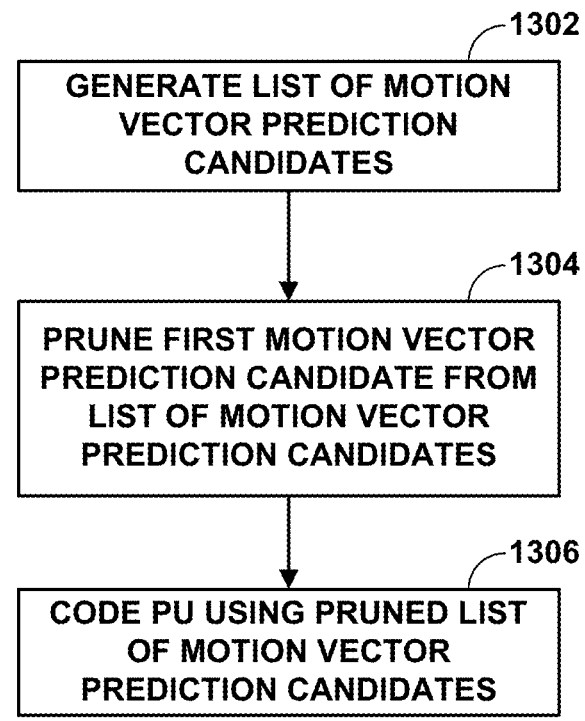
FIG. 13 is a flowchart illustrating an example method for pruning motion vectors based on picture order count values in accordance with the techniques of this disclosure.

In accordance with techniques described herein, POC-based pruning may have the capability to differentiate motion vector prediction candidates with the same motion information while having low complexity and simplicity so as to be easily applied to the latest video codec, e.g. HEVC or any future video coding standards. Since POC-based pruning checks POC value, the techniques described herein may separate motion vector prediction candidates even if all the motion information is identical. Also, POC-based pruning examines a single data point (POC value) instead of multiple motion information data points, i.e. InterDir, RefList, and RefIdx. Therefore, POC-based pruning does not introduce any additional complexity. Moreover, since the techniques described herein look into a POC value that is always available when the motion information exists, the techniques described herein could replace existing pruning methods, i.e. motion information based pruning. An example with regards to FIGS. 12 and 13 show how POC-based pruning may be implemented on HM16.6-based JEM1.0, which is the reference software for the evaluation of next generation video codec.

When comparing two motion vector prediction candidates for a region of interest, two candidates may be either uni-directionally predicted or bi-directionally predicted: uni-MV vs. uni-MV or bi-MV vs. bi-MV. When both motion vector prediction candidates are uni-directionally predicted, POC-based pruning may accommodate more flexible candidates because it may compare two motion vector prediction candidates from different reference lists. For example, the first motion vector prediction candidate, MV[j], may be from reference list L0, and the second motion vector prediction candidate, MV[k], may be from reference list L1. With motion information based pruning, they are always identified as different motion vector prediction candidates because they come from different reference lists. However, POC-based pruning takes into account POC value, not motion information, thus those motion vector prediction candidates may be identified same if POC[j]==POC[k] and MV[j]==MV[k]. If both motion vector prediction candidates are bi-directionally predicted, motion vector prediction candidates are compared similarly to the uni-MV case. Here, four pairs of (MV, POC) are derived and each two pairs comes from a candidate: one from the reference list L0 and another from the list L1. And, two pairs of (MV, POC) from the same candidate are sorted such that POC[i][0] is less than POC[i][1] for all i∈{j, k}. Next, the available four pairs of (MV, POC) are checked by two cascaded conditions: pair-wise equality condition followed by cross equality condition:

1. Pair-wise equality condition:
POC[j][0]==POC[k][0] && POC[j][1]==POC[k][1] && MV[j][0]==MV[k][0] && MV[j][1]==MV[k][1]
2. cross equality condition:
POC[j][0]==POC[k][0] && POC[j][1]==POC[k][1] && POC[j][0]==POC[j][1] &&
MV[j][0]==MV[k][1] && MV[j][1]==MV[k][0]

If one of the conditions are satisfied in the cascaded manner, the two bi-MVs are equal.

TABLE 1

Possible pairs of motion vector prediction candidates that POC-based pruning applies.

| | Category # | Candidate 1 | Candidate 2 |
|---|---|---|---|
| non sub-PU motion vector prediction candidates | C1 | MV[0] of PU | MV[1] of PU |

TABLE 1-continued

Possible pairs of motion vector prediction candidates that POC-based pruning applies.

| | Category # | Candidate 1 | Candidate 2 |
|---|---|---|---|
| sub-PU motion vector prediction candidates | C2 | MV[0][j] of sub-PU within PU | MV[1][k] of sub-PU within PU |
| | C3 | MV[0][j] of sub-PU within PU | MV[1] of non sub-PU |
| | C4 | MVs of sub-PUs | MVs of sub-PUs |
| Bi-MV construction | C5 | MV from L0 in PU | MV from L1 in PU |
| | C6 | MV from L0 in sub-PU | MV from L1 in sub-PU |

Table 1 summarizes what kinds of motion vector prediction candidate pairs may be pruned using POC-based method. In category C1, motion vector prediction candidates from regular PU (no sub-PU) are compared either by uni-MV vs. uni-MV or by bi-MV vs. bi-MV, which was described above. From categories C2 to C4, sub-PU MV(s) is (are) included in the comparison. In category C2, POC-based pruning is used to determine whether sub-PU motion vector prediction candidates within a PU are all identical. This may be handled by applying the same way in category C1 to motion vector prediction candidates from the sub-PU. The situation when all sub-PU motion vector prediction candidates are equal falls into category C3, where a MV represents all the MVs from the sub-Pus. As such, the same comparison as in category C1 is applied. But, if all sub-PU MVs of a candidate are not equal and there exists another candidate having sub-PU MVs, (i.e., category C4), POC-based pruning is applied to each pair of motion vector prediction candidates from the sub-PUs located at the same position within the PU. Both categories C5 and C6 are related to bi-MV construction by combining two uni-MVs: one from L0 and another from L1. If the two uni-MVs are identical (same MV from the same reference picture), no bi-MV construction is required because the resulting bi-MV will be same as the uni-MV. Thus, POC-based pruning may help to save resources by detecting identical motion vector prediction candidates more precisely especially when L0 and L1 have same reference pictures.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
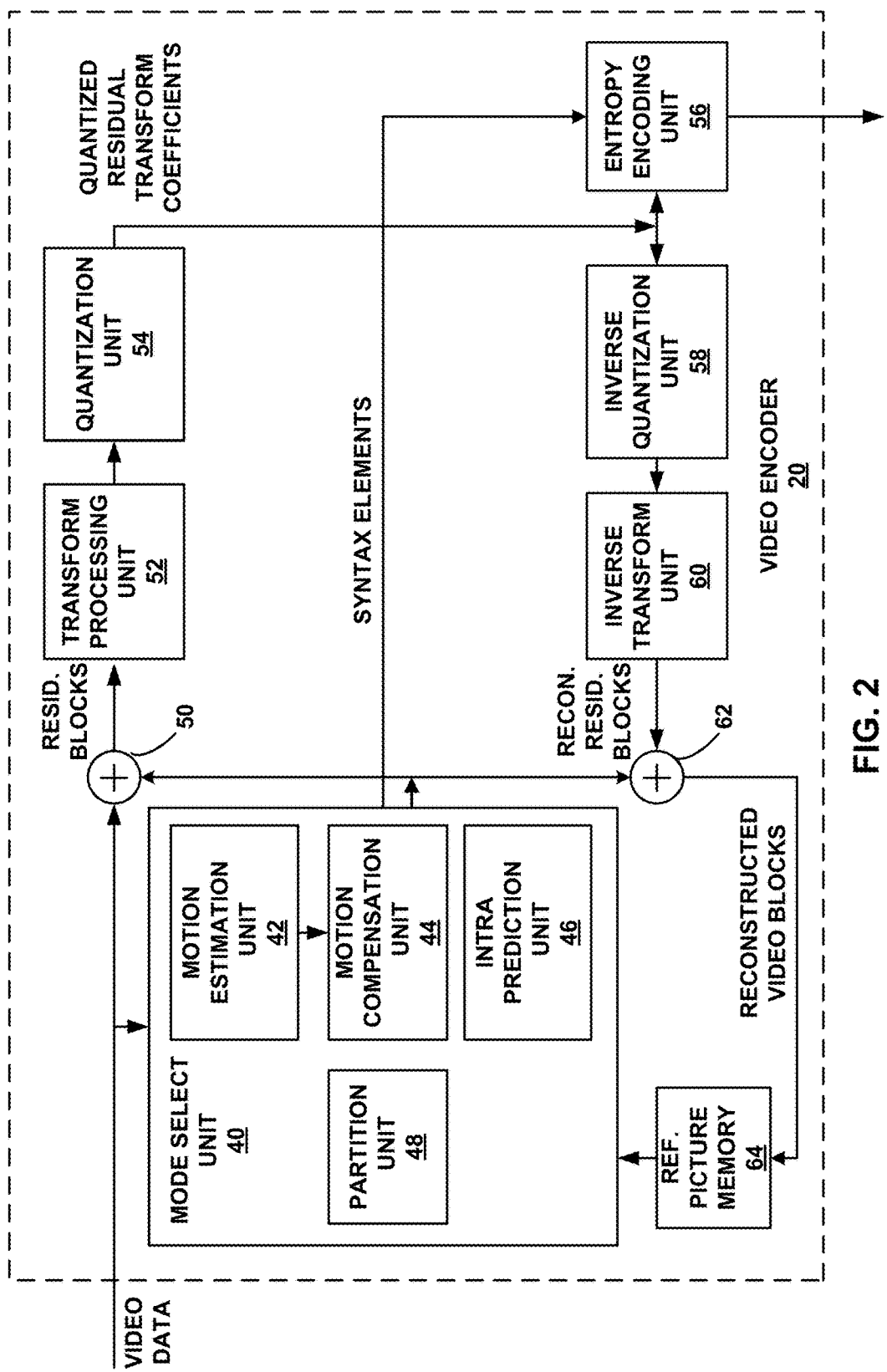
FIG. 2 is a block diagram illustrating an example of video encoder that may implement techniques for pruning motion vectors based on picture order count values.

FIG. 2 is a block diagram illustrating an example of video encoder that may implement techniques for pruning motion vectors based on picture order count values. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

In accordance with techniques of this disclosure, motion compensation unit 44 of video encoder 20 may be configured to perform the various techniques described herein. For instance, motion compensation unit 44 of video encoder 20 may be configured to generate a list of motion vector prediction candidates for a prediction unit (PU) of video data. Motion compensation unit 44 of video encoder 20 may be further configured to prune a first motion vector prediction candidate from the list of motion vector prediction candidates when a first picture order count (POC) value for a reference picture identified by the first motion vector prediction candidate is equal to a second POC value of a reference picture identified by a second motion vector prediction candidate in the list of motion vector prediction candidates. Motion compensation unit 44 of video encoder 20 may also be configured to encode the PU using the pruned list. In particular, motion compensation unit 44 may select an index into the pruned list that identifies one of the motion vector prediction candidates to be used to predict the PU, and provide the index to entropy encoding unit 56 as a syntax element to be entropy encoded. Moreover, motion compensation unit 44 may generate a predicted block using a motion vector derived from the motion vector prediction candidate and provide the predicted block to summer 50 and summer 62.

In some examples, in pruning the list of motion vector prediction candidates, motion compensation unit 44 may determine that the first POC value is equal to the second POC value. Motion compensation unit 44 may further determine that a first motion vector prediction candidate is equal to a second motion vector of the second motion vector prediction candidate. In response to determining that the first POC value is equal to the second POC value and that the first motion vector is equal to the second motion vector, motion compensation unit 44 may remove the first motion vector prediction candidate from the list of motion vector prediction candidates. Before or after removing the first motion vector prediction candidate, motion compensation unit 44 may add (or preserve) another motion vector prediction candidate to or in the list of motion vector prediction candidates that replaces the removed motion vector prediction candidate.

In some examples, motion compensation unit 44 may derive a first motion vector of the first motion vector prediction candidate from a first reference picture list. Motion compensation unit 44 may also derive a second motion vector of the second motion vector prediction candidate from second reference picture list. The first reference picture list may be different than the second reference picture list. For instance, as described above, various prediction modes may use both list L0 and list L1. In accordance with the techniques described herein, one of the two motion vector prediction candidates may include a motion vector derived from list L0, and the second motion vector prediction candidate may include a motion vector derived from list L1. In some instances, the first motion vector prediction candidate and the second motion vector prediction candidate may be motion vectors of a sub-prediction unit (sub-PU) of the PU.

In some instances, the first motion vector prediction candidate and the second motion vector prediction candidate are uni-directional motion vector prediction candidates. In other instances, wherein the first motion vector prediction candidate and the second motion vector prediction candidate are bi-directional motion vector prediction candidates. In instances where the motion vector prediction candidates are bi-directional motion vector prediction candidates, the first POC value is for a first reference picture identified by the first motion vector prediction candidate. The first motion vector prediction candidate further includes a first motion vector. Further, the second POC value is for the second reference picture identified by the second motion vector prediction candidate. The second motion vector prediction candidate further includes a second motion vector. As the motion vector prediction candidates are bi-directional, the first motion vector prediction candidate further includes a third motion vector and a third reference picture with a third POC value, and the second motion vector prediction candidate further includes a fourth motion vector and a fourth reference picture with a fourth POC value.

In some examples where the motion vector prediction candidates are bi-directional, the process of pruning the first motion vector prediction candidate may include motion compensation unit 44 determining that the first POC value is equal to the second POC value. Motion compensation unit 44 may further determine that the first motion vector of the first motion vector prediction candidate is equal to the second motion vector of the second motion vector prediction candidate. Motion compensation unit 44 may further determine that the third POC value is equal to the fourth POC value and that the third motion vector of the first motion vector prediction candidate is equal to the fourth motion vector of the second motion vector prediction candidate. In other words, motion compensation unit 44 may determine that a respective direction of the respective bi-directional motion vector prediction candidates have a matching POC value and a matching motion vector in the corresponding bi-directional motion vector prediction candidate in a pair-wise equality. In response to determining that the first POC value is equal to the second POC value, the first motion vector is equal to the second motion vector, the third POC value is equal to the fourth POC value, and the third motion vector is equal to the fourth motion vector, motion compensation unit 44 may remove the first motion vector prediction candidate from the list of motion vector prediction candidates.

In other examples where the motion vector prediction candidates are bi-directional, the process of pruning the first motion vector prediction candidate may include motion compensation unit 44 determining that the first POC value is equal to the second POC value. Motion compensation unit 44 may further determine that the first motion vector of the first motion vector prediction candidate is equal to the fourth motion vector of the second motion vector prediction candidate. Motion compensation unit 44 may further determine that the third POC value is equal to the fourth POC value and that the third motion vector of the first motion vector prediction candidate is equal to the second motion vector of the second motion vector prediction candidate. In other words, motion compensation unit 44 may determine that a respective direction of the respective bi-directional motion vector prediction candidates have a matching POC value and a matching motion vector in the corresponding bi-directional motion vector prediction candidate in a cross equality condition. In response to determining that the first POC value is equal to the second POC value, the first motion vector is equal to the fourth motion vector, the third POC value is equal to the fourth POC value, the first POC value is equal to the third POC value, and the second motion vector is equal to the third motion vector, motion compensation unit 44 may remove the first motion vector prediction candidate from the list of motion vector prediction candidates.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 3:
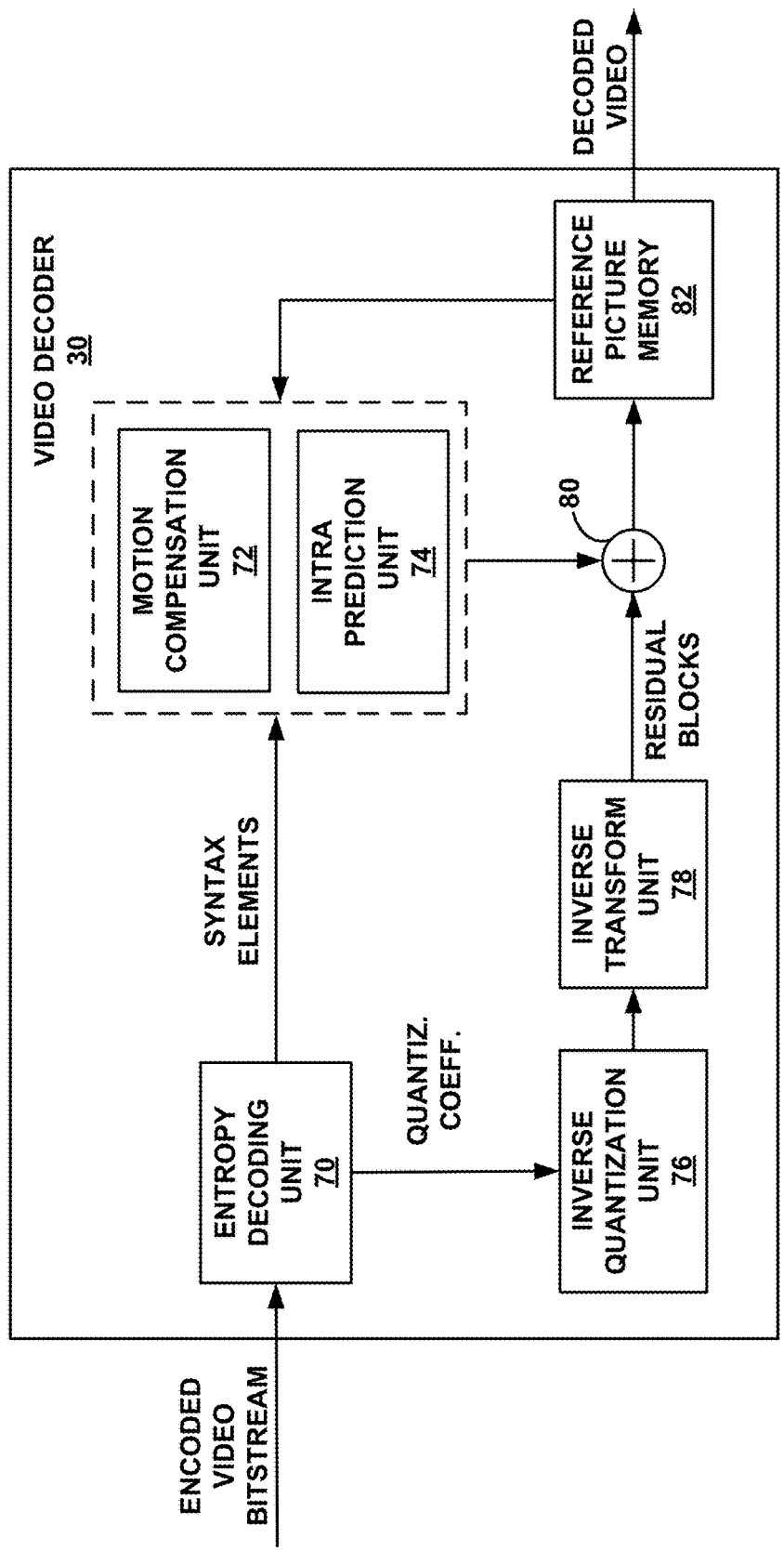
FIG. 3 is a block diagram illustrating an example of video decoder that may implement techniques for pruning motion vectors based on picture order count values.

FIG. 3 is a block diagram illustrating an example of video decoder that may implement techniques for pruning motion vectors based on picture order count values. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In accordance with techniques of this disclosure, motion compensation unit 72 of video decoder 30 may be configured to perform the various techniques described herein. For instance, motion compensation unit 72 of video decoder 30 may be configured to generate a list of motion vector prediction candidates for a prediction unit (PU) of video data. Motion compensation unit 72 of video decoder 30 may be further configured to prune a first motion vector prediction candidate from the list of motion vector prediction candidates when a first picture order count (POC) value for a reference picture identified by the first motion vector prediction candidate is equal to a second POC value of a reference picture identified by a second motion vector prediction candidate in the list of motion vector prediction candidates. Motion compensation unit 72 of video decoder 30 may also be configured to decode the PU using the pruned list.

In particular, motion compensation unit 72 may receive an index value from entropy decoding unit 70, where the index value identifies one of the motion vector prediction candidates in the list of motion vector prediction candidates. Motion compensation unit 72 may reconstruct a motion vector for the PU using the motion vector prediction candidate identified by the index value. For example, in merge mode, motion compensation unit 72 may use motion information from the motion vector prediction candidate, including a reference picture list, reference picture index, and motion vector, to generate a motion vector and predict the PU from a reference block identified by the motion vector in a reference picture identified by the reference picture index in the corresponding reference picture list. As another example, in AMVP mode, motion compensation unit 72 may receive motion information including a reference picture list, reference picture index, and x- and y-offset values from entropy decoding unit 70, construct a predicted motion vector from the motion vector prediction candidate, modify the predicted motion vector using the x- and y-offset values, and predict the PU using a reference block identified by the motion vector in a reference picture identified by the reference picture index in the corresponding reference picture list.

In some examples, in pruning the list of motion vector prediction candidates, motion compensation unit 72 may determine that the first POC value is equal to the second POC value. Motion compensation unit 72 may further determine that a first motion vector prediction candidate is equal to a second motion vector of the second motion vector prediction candidate. In response to determining that the first POC value is equal to the second POC value and that the first motion vector is equal to the second motion vector, motion compensation unit 72 may remove the first motion vector prediction candidate from the list of motion vector prediction candidates.

In some examples, motion compensation unit 72 may derive a first motion vector of the first motion vector prediction candidate from a first reference picture list. Motion compensation unit 72 may also derive a second motion vector of the second motion vector prediction candidate from second reference picture list. The first reference picture list may be different than the second reference picture list. For instance, as described above, various prediction modes may use both list L0 and list L1. In accordance with the techniques described herein, one of the two motion vector prediction candidates may include a motion vector derived from list L0, and the second motion vector prediction candidate may include a motion vector derived from list L1. In some instances, the first motion vector prediction candidate and the second motion vector prediction candidate may be motion vectors of a sub-prediction unit (sub-PU) of the PU.

In some instances, the first motion vector prediction candidate and the second motion vector prediction candidate are uni-directional motion vector prediction candidates. In other instances, wherein the first motion vector prediction candidate and the second motion vector prediction candidate are bi-directional motion vector prediction candidates. In instances where the motion vector prediction candidates are bi-directional motion vector prediction candidates, the first POC value is for the first reference picture identified by the first motion vector prediction candidate. The first motion vector prediction candidate further includes a first motion vector. Further, the second POC value is for a second reference picture identified by the second motion vector prediction candidate. The second motion vector prediction candidate further includes a second motion vector. As the motion vector prediction candidates are bi-directional, the first motion vector prediction candidate further includes a third motion vector and a third reference picture with a third POC value, and the second motion vector prediction candidate further includes a fourth motion vector and a fourth reference picture with a fourth POC value.

In some examples where the motion vector prediction candidates are bi-directional, the process of pruning the first motion vector prediction candidate may include motion compensation unit 72 determining that the first POC value is equal to the second POC value. Motion compensation unit 72 may further determine that the first motion vector of the first motion vector prediction candidate is equal to the second motion vector of the second motion vector prediction candidate. Motion compensation unit 72 may further determine that the third POC value is equal to the fourth POC value and that the third motion vector of the first motion vector prediction candidate is equal to the fourth motion vector of the second motion vector prediction candidate. In other words, motion compensation unit 72 may determine that a respective direction of the respective bi-directional motion vector prediction candidates have a matching POC value and a matching motion vector in the corresponding bi-directional motion vector prediction candidate in a pair-wise equality. In response to determining that the first POC value is equal to the second POC value, the first motion vector is equal to the second motion vector, the third POC value is equal to the fourth POC value, and the third motion vector is equal to the fourth motion vector, motion compensation unit 72 may remove the first motion vector prediction candidate from the list of motion vector prediction candidates.

In other examples where the motion vector prediction candidates are bi-directional, the process of pruning the first motion vector prediction candidate may include motion compensation unit 72 determining that the first POC value is equal to the second POC value. Motion compensation unit 72 may further determine that the first motion vector of the first motion vector prediction candidate is equal to the fourth motion vector of the second motion vector prediction candidate. Motion compensation unit 72 may further determine that the third POC value is equal to the fourth POC value and that the third motion vector of the first motion vector prediction candidate is equal to the second motion vector of the second motion vector prediction candidate. In other words, motion compensation unit 72 may determine that a respective direction of the respective bi-directional motion vector prediction candidates have a matching POC value and a matching motion vector in the corresponding bi-directional motion vector prediction candidate in a cross equality condition. In response to determining that the first POC value is equal to the second POC value, the first motion vector is equal to the fourth motion vector, the third POC value is equal to the fourth POC value, the first POC value is equal to the third POC value, and the second motion vector is equal to the third motion vector, motion compensation unit 72 may remove the first motion vector prediction candidate from the list of motion vector prediction candidates.

Inverse quantization unit 76 inverse quantizes, i.e., de-quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 4:
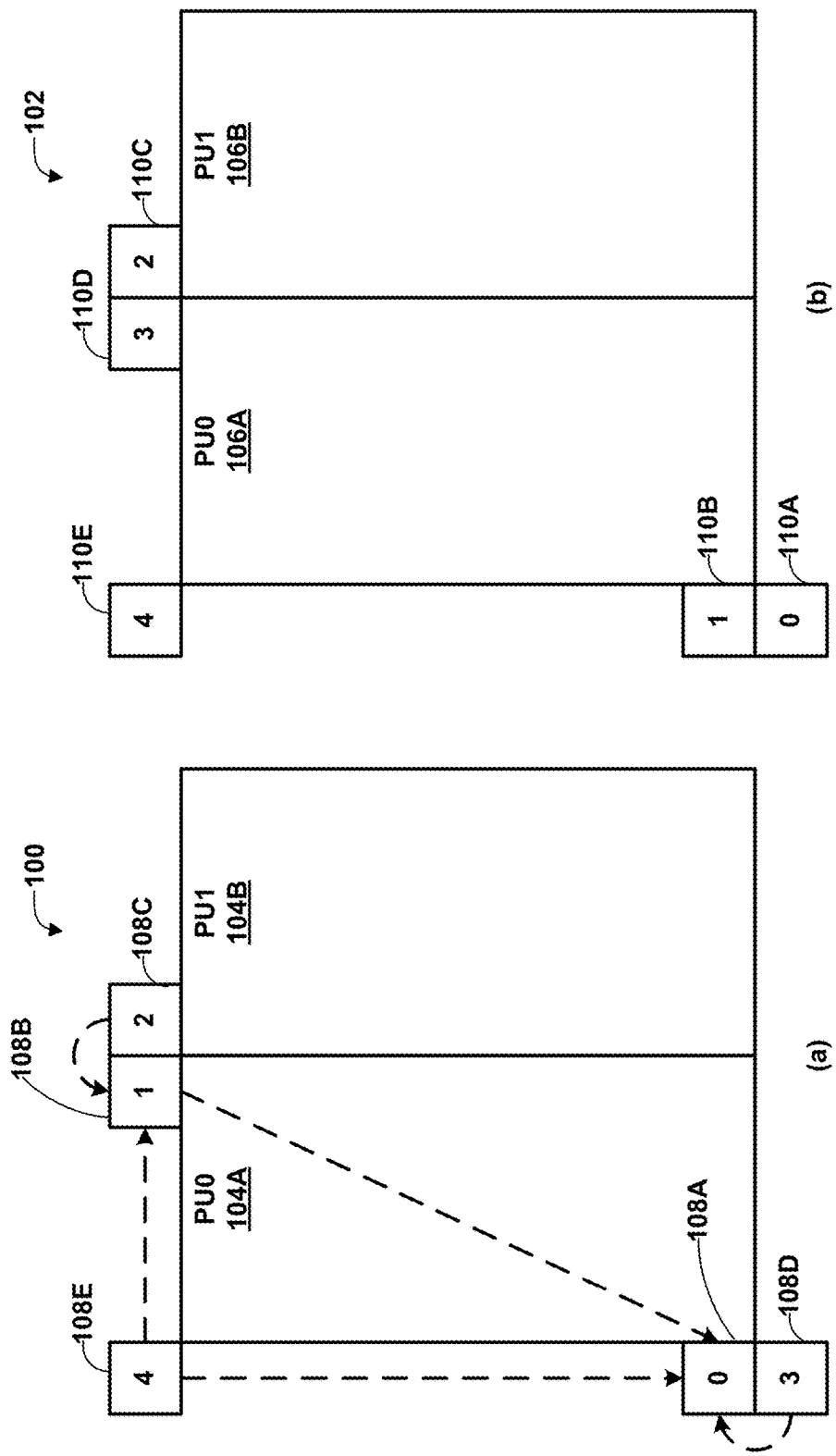
FIG. 4 is a conceptual diagram illustrating spatial neighboring candidates in High Efficiency Video Coding (HEVC).

FIG. 4 is a conceptual diagram illustrating spatial neighboring candidates in High Efficiency Video Coding (HEVC). Spatial MV candidates are derived from the neighboring blocks shown on FIG. 4, for a specific PU (PU0), although the methods generating the candidates from the blocks differ for merge and AMVP modes.

In merge mode, up to four spatial MV candidates may be derived with the orders showed on FIG. 4(*a*) with numbers, and the order is the following: left (0, A1), above (1, B1), above right (2, B0), below left (3, A0), and above left (4, B2), as shown in FIG. 4 (*a*).

In AVMP mode, the neighboring blocks are divided into two groups: left group consisting of the block 0 and 1, and above group consisting of the blocks 2, 3, and 4 as shown on FIG. 4 (*b*). For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences may be compensated.

Figure 5:
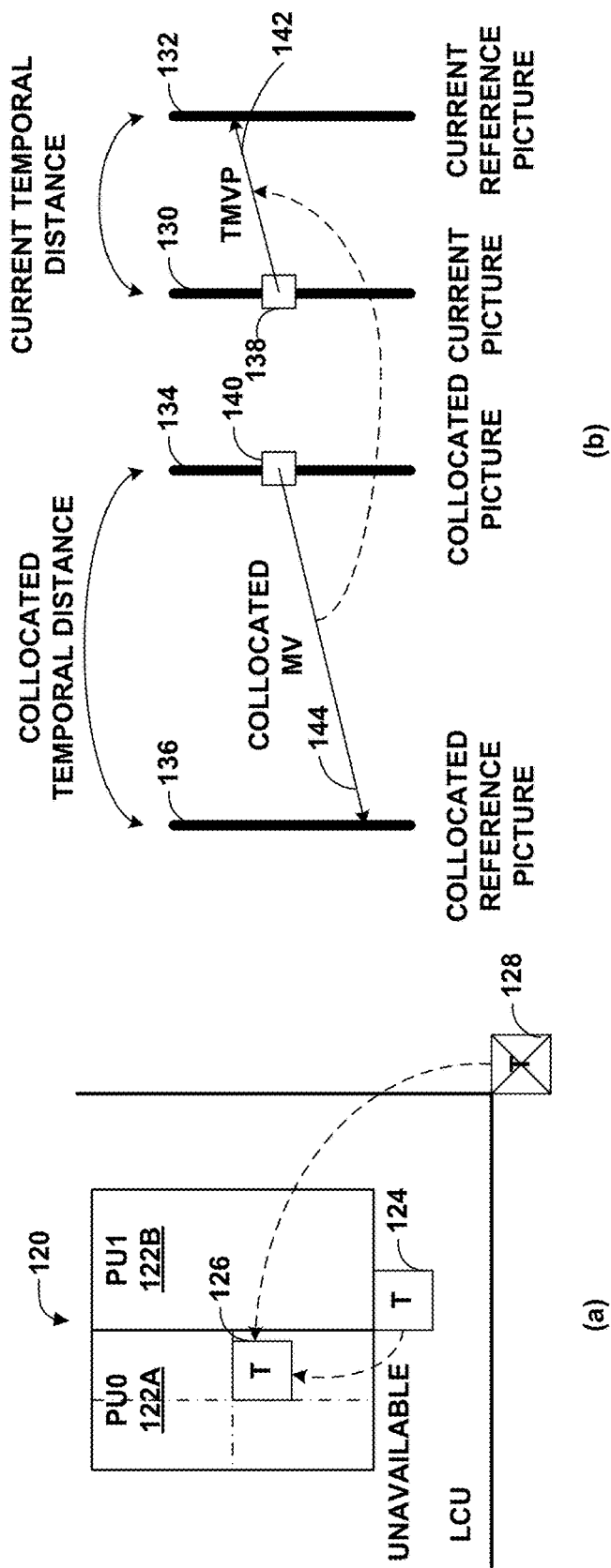
FIG. 5 is a conceptual diagram illustrating temporal motion vector prediction (TMVP) in HEVC.

FIG. 5 is a conceptual diagram illustrating temporal motion vector prediction (TMVP) in HEVC. Temporal motion vector predictor (TMVP) candidate, if enabled and available, is added into the MV candidate list after spatial motion vector candidates. The process of motion vector derivation for TMVP candidate is the same for both merge and AMVP modes, however the target reference index for the TMVP candidate in the merge mode is always set to 0.

The primary block location for TMVP candidate derivation is the bottom right block outside of the collocated PU as shown in FIG. 5(*a*) as a block "T", to compensate the bias to the above and left blocks used to generate spatial neighboring candidates. However, if that block is located outside of the current CTB row or motion information is not available, the block is substituted with a center block of the PU.

The motion vector for the TMVP candidate may be derived from the co-located PU of the co-located picture, indicated in the slice level. The motion vector for the co-located PU is called the collocated MV. Similar to temporal direct mode in AVC, to derive the TMVP candidate motion vector, the co-located MV may be scaled to compensate for the temporal distance differences, as shown in FIG. 5.

It may be assumed that the value of motion vectors is proportional to the temporal distance of pictures in the presentation time. A motion vector associates two pictures: The reference picture and the picture containing the motion vector (namely the containing picture). When a motion vector is utilized to predict the other motion vector, the distance of the containing picture and the reference picture is calculated based on the Picture Order Count (POC) values.

For a motion vector to be predicted, both the associated containing picture and reference picture may be different. Therefore, a new distance (based on POC) is calculated and the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

If a motion vector candidate list is not complete, artificial motion vector candidates may be generated and inserted at the end of the list until the list will have all of the candidates. In merge mode, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates may be derived by a combination of the motion vector of the first candidate referring to a picture in the list 0 and the motion vector of a second candidate referring to a picture in the list 1.

Candidates from different blocks may happen to be the same, which decreases the efficiency of a merge/AMVP candidate list. A pruning process may be applied to solve this problem. In general, the pruning process compares one candidate against the others in the current candidate list to avoid inserting identical candidate in certain extent. To reduce the complexity, only limited numbers of pruning processes may be applied instead of comparing each potential one with all the other existing ones.

Figure 6:
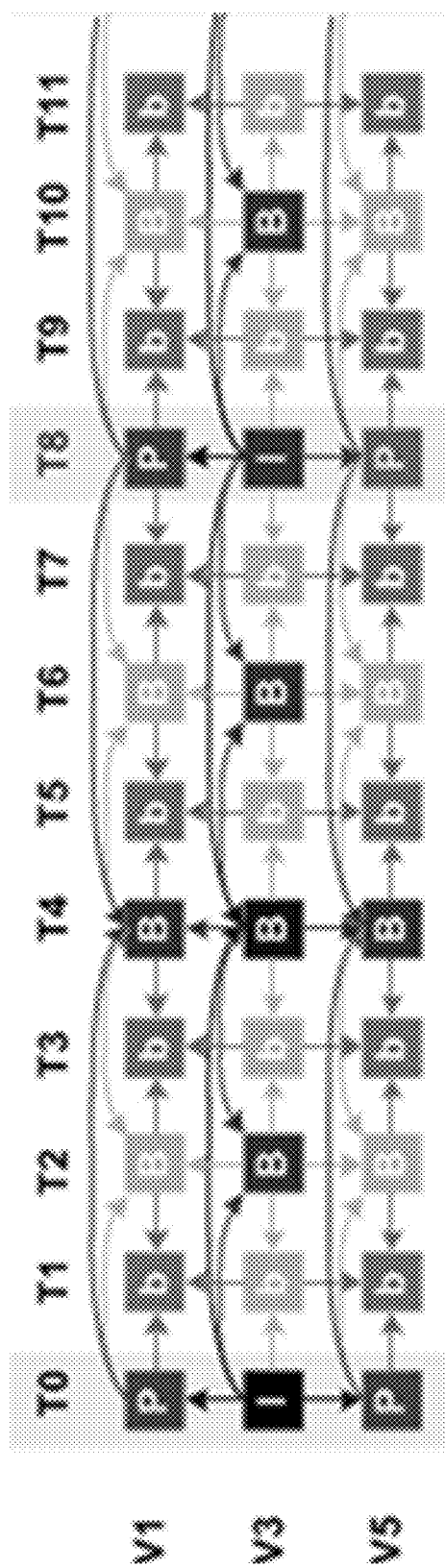
FIG. 6 is a conceptual diagram illustrating an example prediction structure for 3D-HEVC.
Figure 8:
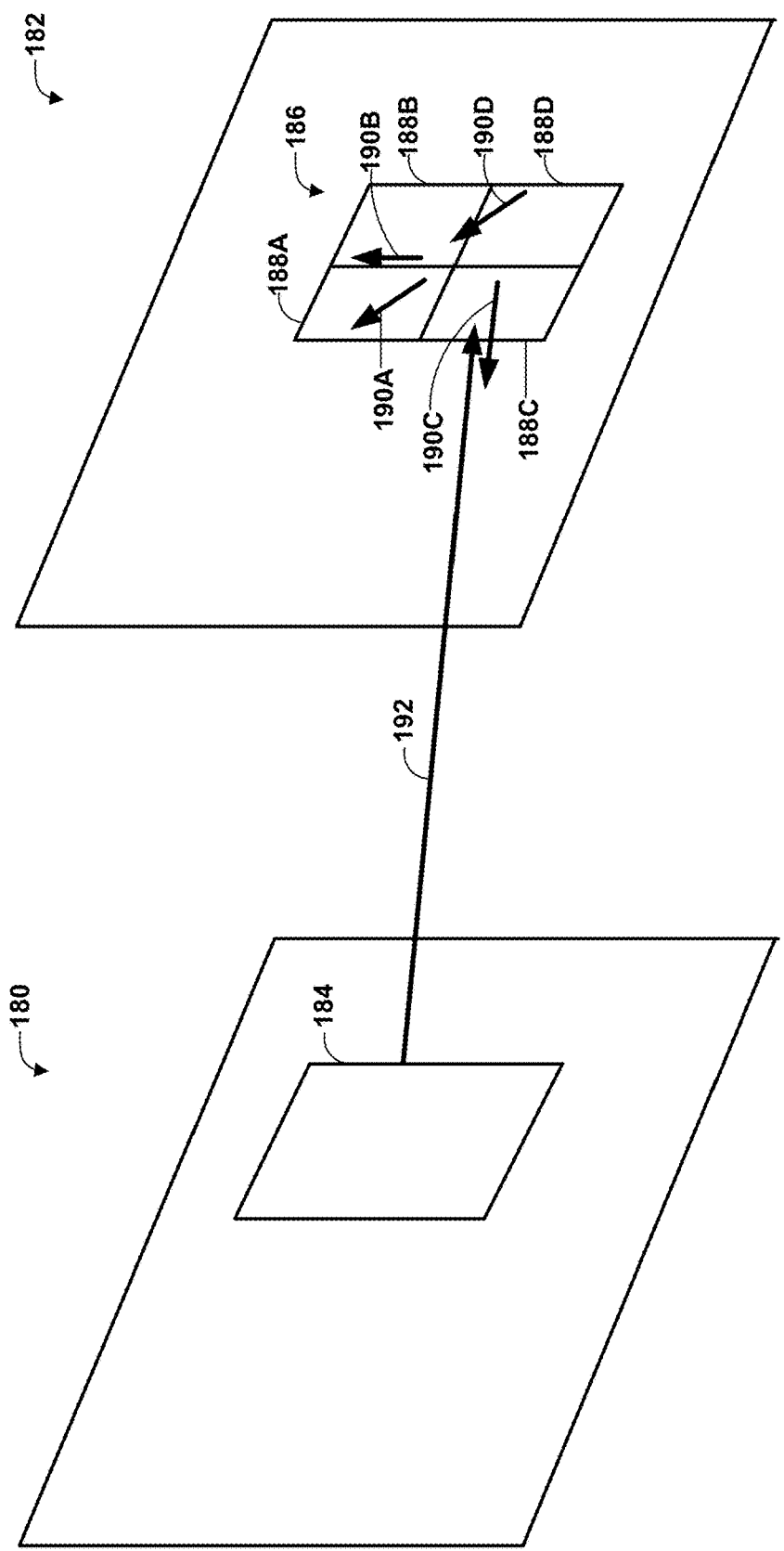
FIG. 8 is a conceptual diagram illustrating sub-PU motion prediction from a reference picture.

FIG. 6 is a conceptual diagram illustrating an example prediction structure for 3D-HEVC. 3D-HEVC is the 3D video extension of HEVC under development by JCT-3V. FIG. 6 shows a multiview prediction structure for a three-view case. V3 denotes the base view and a picture in a non-base view (V1 or V5) may be predicted from pictures in a dependent (base) view of the same time instance. The inter-view sample prediction (from reconstructed samples) is supported in MV-HEVC, a typical prediction structure of which is shown in FIG. 8.

Both MV-HEVC and 3D-HEVC are compatible to HEVC in a way that the base (texture) view is decodable by HEVC (version 1) decoder. A test model for MV-HEVC and 3D-HEVC is described in Zhang et al., "Test Model 6 of 3D-HEVC and MV-HEVC," JCT-3V document ISO/IEC JTC1/SC29/WG11 N13940, available at the website mpeg- .chiariglione.org/standards/mpeg-h/high-efficiency-video-coding/test-model-6-3d-hevc-and-mv-hevc as of Jan. 26, 2015.

In MV-HEVC, a current picture in a non-base view may be predicted by both pictures in the same view and pictures in a reference view of the same time instance, by putting all of these pictures in reference picture lists of the picture. Therefore, a reference picture list of the current picture contains both temporal reference pictures and inter-view reference pictures. A motion vector associated with a reference index corresponding to a temporal reference picture is denoted as a temporal motion vector. A motion vector associated with a reference index corresponding to an inter-view reference picture is denoted as a disparity motion vector.

3D-HEVC supports all features in MV-HEVC. Therefore, the inter-view sample prediction as mentioned above may be enabled. In addition, more advanced texture only coding tools and depth related/dependent coding tools are supported. The texture only coding tools often requires the identification of the corresponding blocks (between views) that may belong to the same object. Therefore, disparity vector derivation is a basic technology in 3D-HEVC.

Figure 7:
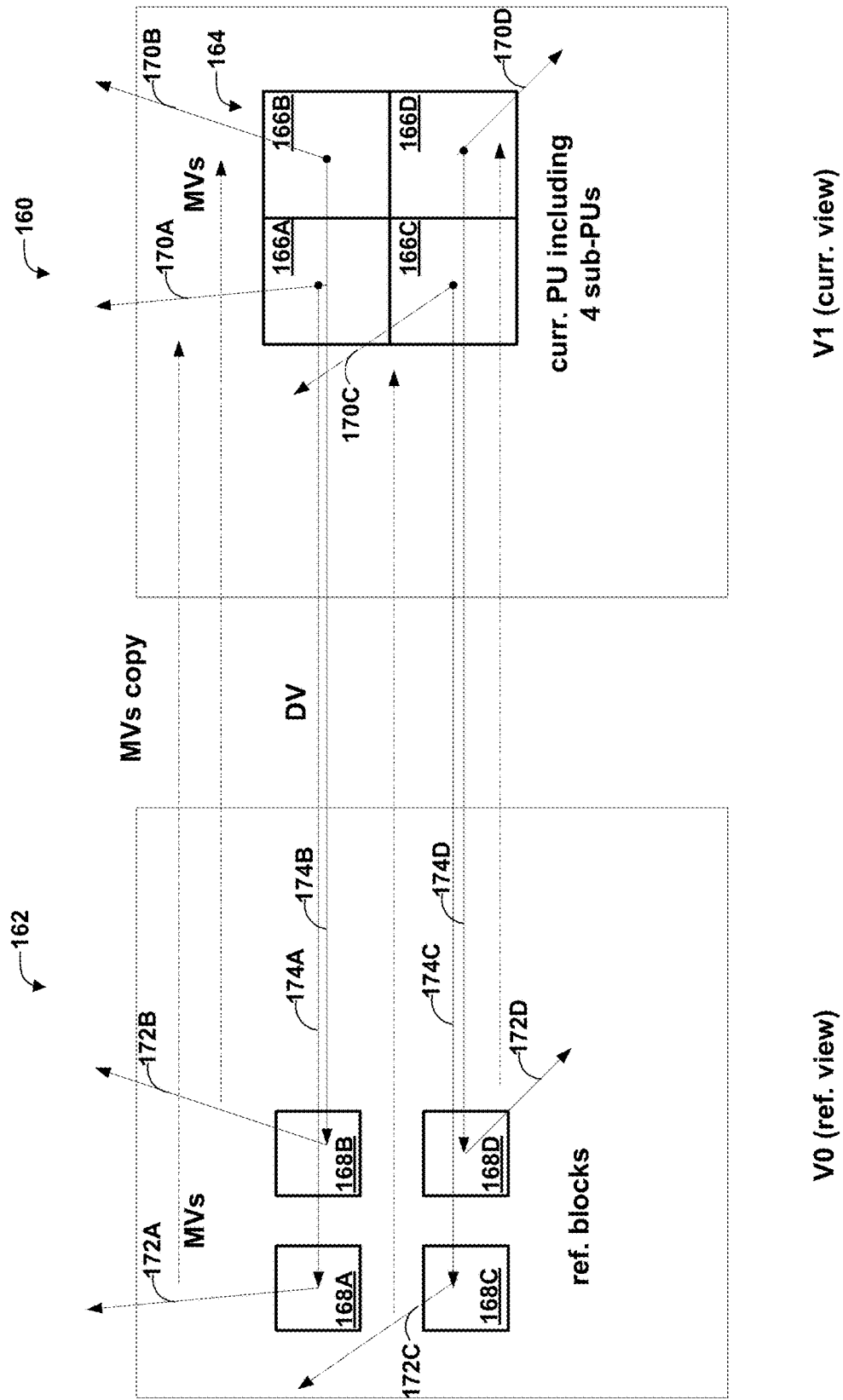
FIG. 7 is a conceptual diagram illustrating sub-PU based inter-view motion prediction in 3D-HEVC.

FIG. 7 is a conceptual diagram illustrating sub-PU based inter-view motion prediction in 3D-HEVC. In 3D-HEVC, a sub-PU level inter-view motion prediction method for the inter-view merge candidate, i.e., the candidate derived from a reference block in the reference view.

When such a mode is enabled, a current PU may correspond to a reference area (with the same size as current PU identified by the disparity vector) in the reference view and the reference area may have richer motion information than needed for generation one set of motion information typically for a PU. Therefore, a sub-PU level inter-view motion prediction (SPIVMP) method is proposed as shown in FIG. 7. This mode is also signaled as a special merge candidate. Each of the sub-PU contains a full set of motion information, therefore a PU may contain multiple sets of motion information.

Similarly, in depth coding of 3D-HEVC the Motion Parameter Inheritance (MPI) candidate derived from texture view may also be extended in a way similar to sub-PU level inter-view motion prediction. For example, if the current depth PU has a co-located region which contains multiple PUs, the current depth PU may be separated into sub-PUs, each may have a different set of motion information. This method is called sub-PU MPI.

In single-layer coding, a two-stage advanced temporal motion vector prediction design is proposed. The first stage is utilized to derive a vector identifying the corresponding block of the current prediction unit (PU) in a reference picture and a second stage is to extract multiple sets motion information from the corresponding block and assign them to sub-PUs of the PU. Each sub-PU of the PU therefore is motion compensated separately.

The concept of the ATMVP is summarized as follows. The vector in the first stage may be derived from spatial and temporal neighboring blocks of the current PU. This process may be achieved as activating a merge candidate among all the other merge candidates.

Applicable to single-layer coding and sub-PU temporal motion vector prediction, a PU or CU may have motion refinement data to be conveyed on top of the predictors. The first stage of vector derivation may also be simplified by just a zero vector. The first stage of vector derivation may include identifying jointly the motion vector and its associated picture. Various ways of selecting the associated picture and further deciding the motion vector to be the first stage vector have been proposed. If the motion information during the above process is unavailable, the "first stage vector" is used for substitution.

A motion vector identified from a temporal neighbor has to be scaled to be used for the current sub-PU, in a way similar to motion vector scaling in TMVP. However, which reference picture such a motion vector may be scaled to may be designed with one of the following ways. In one instance, the picture may be identified by a fixed reference index of the current picture. In another instance, the picture may be identified to be the reference picture of the corresponding temporal neighbor, if also available in a reference picture list of the current picture. In yet another instance, the picture may be set to be the co-located picture identified in the first stage and from where the motion vectors are grabbed from.

Figure 9:
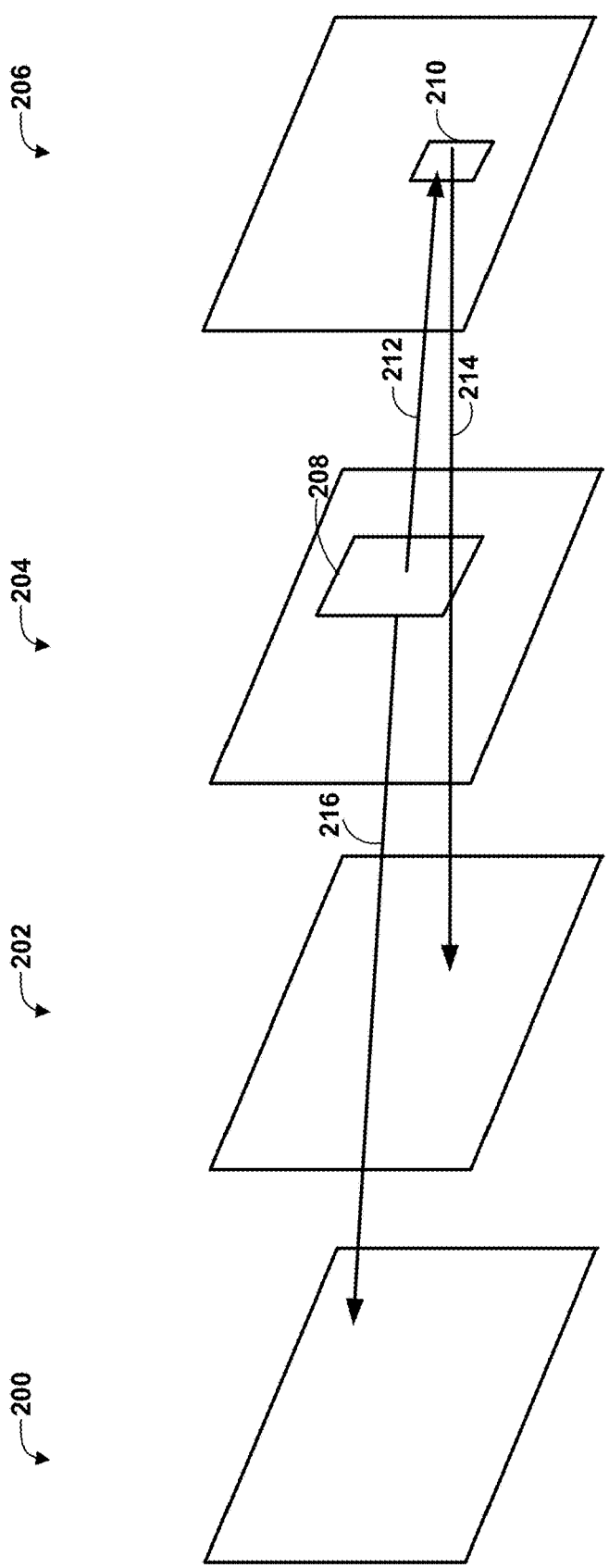
FIG. 9 is a conceptual diagram illustrating relevant pictures in ATMVP (similar to TMVP).

FIG. 8 is a conceptual diagram illustrating sub-PU motion prediction from a reference picture. FIG. 9 is a conceptual diagram illustrating relevant pictures in ATMVP (similar to TMVP). The position of the ATMVP candidate, if inserted e.g., as a merge candidate list, may vary. Assume the spatial candidates and TMVP candidate are inserted into a merge candidate list in a certain order. The ATMVP candidate may be inserted in any relatively fixed position of those candidates. In one instance, for example, the ATMVP candidate may be inserted after the first two spatial candidates e.g., A1 and B1. In another instance, for example, the ATMVP candidate may be inserted after the first three spatial candidates e.g., A1 and B1 and B0. In yet another instance, for example, the ATMVP candidate may be inserted after the first four candidates e.g., A1, B1, B0, and A0. In another instance, for example, the ATMVP candidate may be inserted right before the TMVP candidate. In another instance, for example, the ATMVP candidate may be inserted right after the TMVP candidate. Alternatively, the position of ATMVP candidate in the candidate list may be signaled in the bitstream. The positions of other candidates, including the TMVP candidate may be additionally signalled.

The availability check of the ATMVP candidate may apply by accessing just one set of motion information. When such set of information is unavailable, e.g., one block being intra-coded, the whole ATMVP candidate is considered as unavailable. In that case, the ATMVP will not be inserted into the merge list.

A center position, or a center sub-PU may be used to check the availability of the ATMVP candidate. When a center sub-PU is used, the center sub-PU is chosen to be the one that covers the center position (e.g., the center 3 position, with a relative coordinate of (W/2, H/2) to the top-left sample of the PU, wherein W×H is the size of the PU). Such a position or center sub-PU may be used together with the temporal vector to identify a corresponding block in the motion source picture. A set of motion information from the block that covers the center position of a corresponding block is identified.

A representative set of motion information for the ATMVP coded PU may be derived from a sub-PU. To form the ATMVP candidate, the representative set of motion information is first formed. Such a representative set of motion information may be derived from a fixed position or fixed sub-PU. The fixed position or fixed sub-PU may be chosen in the same way as that of the set of motion information used to determine the availability of the ATMVP candidate.

When a sub-PU has identified its own set of motion information and the motion information is unavailable, the motion information may be set to be equal to the representative set of motion information. If the representative set of motion information is set to be that of a sub-PU, no additional motion storage is needed at the decoder side for the current CTU or slice. Such a representative set of motion information is used in all scenarios that when the decoding processes require the whole PU to be represented by one set of motion information, including pruning, the process to generate combined bi-predictive merging candidates.

The ATMVP candidate may be pruned with TMVP candidate and interactions between TMVP and ATMVP may be considered. The pruning of a sub-PU based candidate, e.g., ATMVP candidate, with a normal candidate may be conducted by using the representative set of motion information for such a sub-PU based candidate. If such set of motion information is the same as a normal merge candidate, the two candidates are considered as the same.

In some instances, in addition, a check may be performed to determine whether the ATMVP contains multiple different sets of motion information for multiple sub-PUs. If at least two different sets are identified, the sub-PU based candidate is not used for pruning, i.e. is considered to be different to any other candidate. Otherwise, the sub-PU based candidate may be used for pruning.

In some instances, in addition, the ATMVP candidate may be pruned with the spatial candidates, e.g., the left and top ones only, with positions denoted as A1 and B1. Alternatively, only one candidate is formed from temporal reference, being either ATMVP candidate or TMVP candidate. When ATMVP is available, the candidate is ATMVP. Otherwise, the candidate is TMVP. Such a candidate is inserted into the merge candidate list in a position similar to the position of TMVP. In this case, the maximum number of candidates may be kept as unchanged. Alternatively, TMVP is always disabled even when ATMVP is unavailable. Alternatively, TMVP is used only when ATMVP is unavailable.

Alternatively, when ATMVP is available and TMVP is unavailable, one set of motion information of one sub-PU may be used as the TMVP candidate. In this case, furthermore, the pruning process between ATMVP and TMVP is not applied. Alternatively, or additionally, the temporal vector used for ATMVP may be also used for TMVP, such that the bottom-right position or center 3 position as used for current TMVP in HEVC may not be used. Alternatively, the position identified by the temporal vector and the bottom-right and center 3 positions are jointly considered to provide an available TMVP candidate.

Multiple availability checks for ATMVP are supported to give higher chances for the ATMVP candidate to be more accurate and efficient. When the current ATMVP candidate from the motion source picture as identified by the first temporal vector (e.g., as shown in FIG. 9) is unavailable, other pictures may be considered as a motion source picture. When another picture is considered, the picture may be associated with a different second temporal vector, or may be associated simply with a second temporal vector scaled from the first temporal vector that points to the unavailable ATMVP candidate.

A second temporal vector may identify an ATMVP candidate in a second motion source picture and the same availability check may apply. If the ATMVP candidate as derived from the second motion source picture is available, the ATMVP candidate is derived and no other pictures may be checked, otherwise, other pictures as motion source pictures may be checked.

Pictures to be checked may be those in the reference picture lists of the current picture, with a given order. For each list, the pictures are checked in the ascending order of the reference index. List X is first checked and pictures in list Y (being 1-X) follows. List X may be chosen so that list X is the list that contains the co-located picture used for TMVP. Alternatively, X is simply set to be 1 or 0. Pictures to be checked are those identified by motion vectors of the spatial neighbors, with a given order.

A partition of the PU that the current ATMVP may apply to may be 2N×2N, N×N, 2N×N, N×2N or other AMP partitions, such as 2N×N/2. In some examples, in addition, if other partition sizes may be allowed. For instance, ATMVP may be supported to include such a size as 64×8. Alternatively, the mode may be only applied to certain partitions, e.g., 2N×2N. The ATMVP candidate may be marked as a different type of merge.

When identifying a vector (temporal vector as in the first stage) from neighbors, multiple neighboring positions, e.g., those used in merge candidate list construction, may be checked in order. For each of the neighbors, the motion vectors corresponding to reference picture list 0 (list 0) or reference picture list 1 (list 1) may be checked in order. When two motion vectors are available, the motion vectors in list X may be checked first and followed by list Y (with Y being equal to 1-X), so that list X is the list that contains the co-located picture used for TMVP. In ATMVP, a temporal vector is used be added as a shift of any center position of a sub-PU, wherein the components of temporal vector may be shifted to integer numbers. Such a shifted center position is used to identify a smallest unit that motion vectors may be allocated to, e.g., with a size of 4×4 that covers the current center position.

In some examples, motion vectors corresponding to list 0 may be checked before those corresponding to list 1. Alternatively, motion vectors corresponding to list 1 may be checked before those corresponding to list 0. In yet another alternative example, all motion vectors corresponding to list X in all spatial neighbors are checked in order, followed by the motion vectors corresponding to list Y (with Y being equal to 1-X). Here, X may indicate where co-located picture belongs to, or X may simply set to be 0 or 1. The order of the spatial neighbors may be the same as that used in HEVC merge mode.

When in the first stage of identifying a temporal vector does not consist identifying a reference picture, the motion source picture, as shown in FIG. 9, may be simply set to be a fixed picture, e.g., the co-located picture used for TMVP. In such an example, the vector may only be identified from the motion vectors that point to such a fixed picture. Furthermore, the vector may only be identified from the motion vectors that point to any picture but further scaled towards the fixed picture.

When the first stage of identifying a vector includes identifying a reference picture and the motion source picture, as shown in FIG. 9, additional checks may apply for a candidate motion vector. If the motion vector is associated with a picture or a slice that is Intra coded, such a motion vector is considered as unavailable and cannot be used to be converted to the vector. Further, if the motion vector identifies an Intra block (by e.g., adding the current center coordinate with the motion vector) in the associated a picture, such a motion vector is considered as unavailable and cannot be used to be converted to the vector.

When in the first stage of identifying a vector, the components of the vector may be set to be half width of the current PU and half height of the current PU, so that a video coder identifies a bottom-right pixel position in the motion source picture. Here, (x, y) may indicate the horizontal and vertical components of one motion vector. Alternatively, the horizontal component of the vector may be set to be a sum of half the width of the current PU and M, and the vertical component of the vector may be set to be a sum of half height of the current PU and N. In one example, when the motion information is stored in a 4×4 unit, M and N are both set to be equal to 2. In another example, when the motion information is stored in an 8×8 unit, M and N are both set to be equal to 4.

The sub-block/sub-PU size, when ATMVP applies, may be signaled in a parameter set, e.g., sequence parameter set of picture parameter set. The size ranges from the least PU size to the CTU size. The size may also be pre-defined or signaled. The size of the least PU size may be as small as 4×4. Alternatively, the sub-block/sub-PU size may be derived based on the size of PU or CU. For example, the sub-block/sub-PU may be set equal to max (4×4, (width of CU)>>M). The value of M may be pre-defined or signaled in the bitstream.

The maximum number of merge candidates may be increased by 1 due to the fact that ATMVP may be considered as a new merge candidate. For example, compared to HEVC, which may take up to 5 candidates in a merge candidate list after pruning, the maximum number of merge candidates may be increased to 6. Alternatively, pruning with conventional TMVP candidate or unification with the conventional TMVP candidate may be performed for ATMVP such that the maximum number of merge candidates may be kept as unchanged. Alternatively, when ATMVP is identified to be available, a spatial neighboring candidate is excluded from the merge candidate list, e.g. the last spatial neighboring candidate in fetching order is excluded.

When multiple spatial neighboring motion vectors are considered to derive the temporal vector, a motion vector similarity may be calculated based on the neighboring motion vectors of the current PU as well as the neighboring motion vectors identified by a specific temporal vector being set equal to a motion vector. The one that leads to the highest motion similarity may be chosen as the final temporal vector. In one alternative, for each motion vector from a neighboring position N, the video coder identifies a block (same size as the current PU) in the motion source picture, wherein its neighboring position N contains a set of the motion information. This set of motion vector is compared with the set of motion information as in the neighboring position N of the current block.

In another alternative, for each motion vector from a neighboring position N, the video coder identifies a block in the motion source picture, wherein its neighboring positions contain multiple sets of motion information. These multiple sets of motion vector are compared with the multiple sets of motion information from the neighboring positions of the current PU in the same relative positions. A motion information similarity is calculated. For example, the current PU has the following sets of motion information from A1, B1, A0 and B0, denoted as $MI_{A1}$, $MI_{B1}$, $MI_{A0}$ and $MI_{B0}$. For a temporal vector TV, the video coder identifies a block corresponding to the PU in the motion source picture. Such a block has motion information from the same relative A1, B1, A0 and B0 positions, and denoted as $TMI_{A1}$, $TMI_{B1}$, $TMI_{A0}$ and $TMI_{B0}$. The motion similarity as determined by TV is calculated as $MS_{tv} = \Sigma_{N \in \{A1,B1,A0,B0\}} MVSim(MI_N, TMI_N)$, wherein MVSim defines the similarity between two sets of motion information.

In both of the above cases, the motion similarity MVSim may be used, wherein the two input parameters are the two motion information, each contains up to two motion vectors and two reference indices. Since each pair of the motion vectors in list X are associated with reference pictures in different list X of different pictures, the current picture and the motion source picture. For each of the two motion vectors $MVX_N$ and $TMVX_N$ (with X being equal to 0 or 1), the motion vector difference $MVDX_N$ may be calculated as $MVX_N - TMVX_N$. Afterwards, the difference MVSimX is calculated as e.g., $abs(MVDX_N[0]) + abs(MVDX_N[1])$, or $(MVDX_N[0] * MVDX_N[0] + MVDX_N[1] * MVDX_N[1])$. If both sets of motion information contain available motion vectors, MVSim is set equal to MVSim0+MVSim1.

In order to have a unified calculation of the motion difference, both of the motion vectors may be scaled towards the same fixed picture, which may be, e.g., the first reference picture RefPicListX[0] of the list X of the current picture. If the availability of the motion vector in list X from the first set and the availability of the motion vector in list X from the second set are different, i.e., one reference index is −1 while the other is not. Such two sets of motion information are considered as not similar in direction X. If the two sets are not similar in both sets, the final MVSim function may return a big value T, which may be e.g., considered as infinite.

Alternatively, for a pair of sets of motion information, if one is predicted from list X (X being equal to 0 or 1) but not list Y (Y being equal to 1-X) and the other has the same status, a weighting between 1 and 2 (e.g., MVSim is equal to MVSimX*1.5). When one set is only predicted from list X and the other is only predicted from list Y, MVSim is set to the big value T. In other instances, for any set of motion information, as long as one motion vector is available, both motion vectors will be produced. In the case that only one motion vector is available (corresponding to list X), the motion vector is scaled to form the motion vector corresponding to the other list Y.

Alternatively, the motion vector may be measured based on difference between the neighboring pixels of the current PU and the neighboring pixels of the block (same size as the current PU) identified by the motion vector. The motion vector that leads to the smallest difference may be chosen as the final temporal vector.

When deriving the temporal vector of the current block, motion vectors and/or temporal vectors from neighboring blocks that are coded with ATMVP may have a higher priority than motion vectors from other neighboring blocks. In one example, only temporal vectors of neighboring blocks are checked first. The first available vector may be set to the temporal vector of the current block. Only when such temporal vectors are not present, normal motion vectors are further checked. In this case, temporal vectors for ATMVP coded blocks may be stored.

In another example, only motion vectors from ATMVP coded neighboring blocks are checked first. The first available vector may be set to the temporal vector of the current block. Only when such temporal vectors are not present, normal motion vectors are further checked.

In yet another example, only motion vectors from ATMVP coded neighboring blocks are checked first. The first available vector may be set to the temporal vector of the current block. If such motion vectors are not available, the checking of temporal vector continues with the temporal vectors.

In another example, temporal vectors from neighboring blocks are checked first. The first available vector may be set to the temporal vector of the current block. If such motion vectors are not available, the checking of temporal vectors continue. In another example, temporal vectors and motion vectors of ATMVP coded neighboring blocks are checked first. The first available one may be set to the temporal vector of the current block. Only when such temporal vectors and motion vectors are not present, normal motion vectors are further checked.

When multiple spatial neighboring motion vectors are considered to derive the temporal vector, a motion vector may be chosen so that the video coder minimizes the distortion that is calculated from pixel domain, e.g., template matching may be used to derive the temporal vector such that the one leads to minimal matching cost is selected as the final temporal vector.

Derivation of a set of motion information from a corresponding block (in the motion source picture) may be done in a way that when a motion vector is available in the corresponding block for any list X (denote the motion vector to be MVX), for the current sub-PU of the ATMVP candidate, the motion vector is considered as available for list X (by scaling the MVX). If the motion vector is unavailable in the corresponding block for any list X, the motion vector is considered as unavailable for list X.

In some instances, when motion vector in the corresponding block is unavailable for list X but available for list 1-X (denoted 1-X by Y and denote the motion vector to be MVY), the motion vector is still considered as available for list X (by scaling the MVY towards the target reference picture in list X.

In some instances, in addition, when both motion vectors in the corresponding block for list X and list Y (equal to 1-X) are available, the motion vectors from list X and list Y are not necessary used to be directly scaled to generate the two motion vectors of a current sub-PU by scaling.

In one example, when formulating the ATMVP candidate, the low-delay check as done in TMVP may apply to each sub-PU. If for every picture (denoted by refPic) in every reference picture list of the current slice, the POC of refPic is smaller than the POC of the current slice, the current slice is considered with low-delay mode. In this low-delay mode, motion vectors from list X and list Y are scaled to generate the motion vectors of a current sub-PU for list X and list Y respectively. When not in the low-delay mode, only one motion vector MVZ from MVX or MVY is chosen and scaled to generate the two motion vectors for a current sub-PU. Similar to TMVP, in such a case, Z is set equal to collocated_from_10_flag, meaning that Z depends on whether the co-located picture as in TMVP is in the list X or list Y of the current picture. Alternatively, if the motion source picture is identified from list X, Z is set to X.

In some instances, in addition, when the motion source pictures belong to both reference picture lists, and RefPicList0[idx0] is the motion source picture that is first present in list 0 and RefPicList(1)[idx1] is the motion source picture that is first present in list 1, Z is set to be 0 if idx0 is smaller than or equal to idx1, and set to be 1 otherwise.

The motion source picture may be signaled. In detail, a flag indicating whether the motion source picture is from list 0 or list 1 is signaled for a B slice. Alternatively, in addition, a reference index to a list 0 or list 1 of the current picture may be signalled to identify the motion source picture.

When identifying a temporal vector, a vector is considered as unavailable (thus other ones may be considered) if the temporal vector points to an Intra coded block in the associated motion source picture. In accordance with the techniques described herein, the motion vector for each sub-PU may be derived from the information of neighboring blocks in three-dimensional domain. This means the neighboring blocks could be the spatial neighbors in the current picture or the temporal neighbors in previous coded pictures. A video coding device first obtains available motion field from spatial or temporal neighboring blocks for a current sub-PU. The video coding device then derives motion information from the obtained neighboring motion field. If more sub-PUs remain, the video coding device repeats the above steps. If all sub-PUs have derived motion information, the video coding device may determine the availability of spatial-temporal sub-PU motion predictors. The video coding device may then insert spatial-temporal sub-PU motion predictors into the merge list if available.

In the following description, the term "block" is used to refer the block-unit for storage of prediction related info, e.g. inter or intra prediction, intra prediction mode, motion information etc. Such prediction info may be saved and used for coding future blocks, e.g. predicting the prediction mode information for future blocks. In AVC and HEVC, the size of such a block is 4×4.

It is noted that in the following description, 'PU' indicates the inter-coded block unit and sub-PU to indicate the unit that derives the motion information from neighbouring blocks. Any combination of the following methods may be applied.

Figures 10A, 10B:
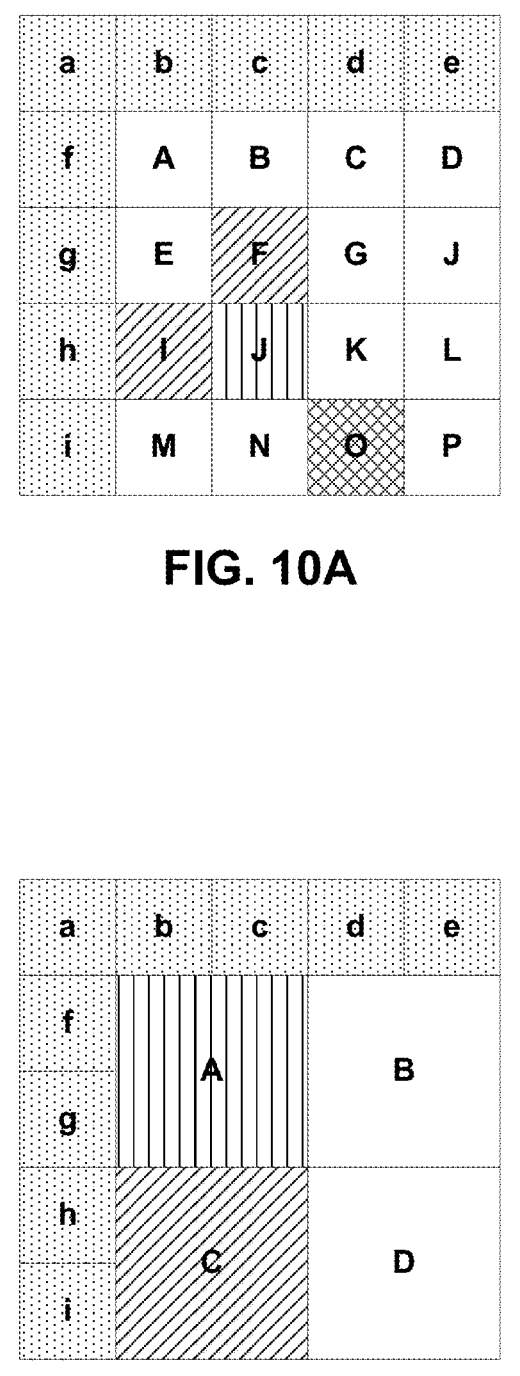

FIGS. 10A and 10B are conceptual diagrams illustrating examples of sub-PUs of a PU, as well as neighboring sub-PUs to the PU. Considering a PU with multiple sub-PUs, the size of a sub-PU is usually equal to or bigger than that neighboring block size. In one example, as shown in FIGS. 10A and 10B, grey squares represent neighboring blocks (a, b, . . . i) that are outside of the current PU and the remaining squares (A, B, . . . P) represent the sub-PUs in the current PU and the sizes of sub-PU and its neighboring block are the same. For example, the size is equal to 4×4. FIG. 10B shows another example where sub-PUs is bigger than the neighboring blocks. In some instances, sub-PUs may take non-squared shapes, such as rectangle, or triangle. In some instances, furthermore, the size of sub-PU may be signaled in a slice header.

Considering the case in FIG. 10A, the raster scan order (A, B, C, D, E . . . ) may be applied to sub-PUs for their motion prediction derivation in the following description of the techniques of this disclosure. However, other scan orders may be applied also and it should be noted that the techniques described herein are not limited to raster scan order only.

Neighboring blocks may be classified into two different types: spatial and temporal. A spatial neighboring block is an already coded block or an already scanned sub-PU that is in the current picture or slice and neighboring to the current sub-PU. A temporal neighboring block is a block in the previous coded picture and neighboring to the co-located block of the current sub-PU. In one example, all the reference pictures associated with current PU are used to obtain the temporal neighboring block. In another example, a sub-set of reference pictures are used for STMVP derivation, e.g., only the first entry of each reference picture list is used.

Following this definition, for sub-PU (A), all grey blocks (a, b, . . . i) and their collocated blocks in previous coded pictures are spatial and temporal neighboring blocks that are treated as available. According to the raster scan order, blocks B, C, D, E . . . P are not spatially available. Though, all sub-PUs (from A to P) are temporally available neighboring blocks for sub-PU (A), because their motion information may be found in their collocated blocks in previous coded pictures. Take sub-PU (G) as another example, its spatial neighboring blocks that are available include those from a, b . . . to i, and also from A to F. Alternatively, furthermore, certain restriction may be applied to the spatial neighbouring blocks, e.g., the spatial neighbouring blocks (i.e., from a, b . . . to i) shall be in the same LCU/slice/tile.

In the techniques described herein, a subset of all available neighboring blocks may be selected to derive motion information or motion field for each sub-PU. The subset used for derivation of each PU may be pre-defined. Alternatively, the subset may be signalled as high level syntax in slice header/PPS/SPS. To optimize the coding performance, the subset may be different for each sub-PU. In practice, a fixed pattern of location for the subset is preferred for simplicity. For example, each sub-PU may use its immediate above spatial neighbor, its immediate left spatial neighbor and its immediate bottom-right temporal neighbor as the subset. As shown in FIG. 10A, when considering sub-PU (J), the block above (F) and the block left (I) are spatially available neighboring blocks and the bottom-right block (O) is temporally available neighboring block. With such a subset, sub-PUs in the current PU has to be processed sequentially due to processing dependency.

To allow paralleling processing of each sub-PU in the current PU, a different subset of neighboring blocks may be defined and used. In one example, a subset only contain spatial neighbor blocks that do not belong to the current PU, e.g., blocks a, b, . . . i. In this case, parallel processing would be possible. In another example, for a given sub-PU, if its spatial neighboring block is within the current PU, the collocated block of that spatial neighboring block may be put in the subset and used to derive the motion information of the current sub-PU. For example, when considering sub-PU (J), the temporal collocated blocks of the above block (F) and the left block (I) and bottom-right block (O) are selected as the subset to derive the motion of the sub-PU (J). In this case, the subset for sub-PU (J) contains three temporal neighboring blocks. In another example, partially-paralleling process may be enabled wherein one PU is split into several regions and each region (covering several sub-PUs) could be processed independently.

In some examples, the neighboring blocks may be intra coded, wherein it is desirable to have a rule to determine replacement motion information for those blocks for better motion prediction and coding efficiency. For example, considering sub-PU (A), there might be cases where block b, c, f are intra-coded, and a, d, e, g, h, i are inter-coded.

For spatial neighbors, a pre-defined order may be used to populate the motion information of intra-coded blocks with that of the first found inter coded block. For example, the searching order of the above neighbors may be set as starting from the immediate above neighbor rightward until the rightmost neighbor, meaning the order of b, c, d, and e. The search order of the left neighbors may be set as starting from the immediate left neighbor downward until the bottommost neighbor, meaning the order of f, g, h, and i. If no inter-coded block is found through the search process, then above or left spatial neighbor is considered unavailable.

For temporal neighbors, the same rule as specified in the TMVP derivation may be used. However, it should be noted that other rules may also be used, e.g. rules based on motion direction, temporal distance (search in different reference pictures) and spatial locations, etc.

Target reference picture determination and motion vector scaling: For each neighboring block, motion vector scaling is applied to its motion vector based on each reference picture list in order to map all the neighboring blocks' motion vectors to a same reference picture in each list. There are two steps: first, determine a source motion vector which we use for scaling. Second, determine a target reference picture where the source motion vector is projected to. For the first step, several methods may be used.

In one example, for each reference list, motion vector scaling may be independent from motion vector in another reference list. For a given block's motion information, if there is no motion vector in a reference list (e.g., uni-prediction mode instead of bi-prediction mode), no motion vector scaling is performed for that list.

In another example, motion vector scaling is not independent from motion vector in another reference list. For a given block's motion information, if no motion vector is unavailable in a reference list, the motion information may be scaled from the one in another reference list. In yet another example, both motion vectors are scaled from one pre-defined reference list (as in TMVP).

The target reference picture may be selected according to a certain rule based on the motion information (e.g. reference pictures) of available spatial neighboring blocks. One example of such a rule is the majority rule, i.e. selecting the reference picture shared by majority of the blocks. In this case there is no signaling needed for the target reference picture from the encoder to decoder because the same information may also be inferred at decoder side using the same rule. Alternatively, such reference picture may also be specified explicitly in slice header, or signalled in some other methods to decoder. According to the techniques described herein, the target reference picture is determined as the first reference picture (refidx=0) of each reference list.

Derive motion information for a given sub-PU: After retrieving motion information from neighboring blocks as illustrated in the previous section and motion scaling process (if needed), the motion information of the current sub-PU is derived. Assume there are N available neighboring blocks with motion information for one given sub-PU. First, the prediction direction (InterDir) has to be determined. InterDir may be initialized as zero, then looping through the motion information of N available neighboring blocks. If there is at least one motion vector in List 0, then InterDir=(InterDir bitwiseOR 1). If there is at least one motion vector in List 1, then InterDir=(InterDir bitwiseOR 2). Here "bitwiseOR" represent the bitwise OR operation. The value of InterDir is defined as: 0 (no inter prediction), 1 (inter prediction based on List 0), 2 (inter prediction based on List 1), and 3 (inter prediction based on both List 0 and List 1).

Alternatively, similar to the determination on target reference picture for motion vector scaling described above, the majority rule may be used to determine the value of InterDir for the given sub-PU based on all available neighboring blocks' motion information.

After InterDir is determined, motion vectors may be derived. For each reference list based on the derived InterDir, there may be M motion vectors (M⇐N) available through motion vector scaling to a target reference picture. The motion vector for the reference list may be derived as:

$$(MV_x, MV_y) = \left[ \left( \sum_{i=0}^{M} w_i * MV_{xi} + O_i \right) / \sum_{i=0}^{M} w_i, \left( \sum_{j=0}^{M} w_j * MV_{yj} + O_j \right) / \sum_{j=0}^{M} w_j \right]$$

where $w_i$ and $w_j$ are the weighting factors for the horizontal and the vertical motion component respectively, and $O_i$ and $O_j$ are the offset values that are dependent on the weighting factors.

The weighting factors may be determined based on various factors. In one example, the same rule may be applied to all sub-PUs within one PU. For example, the weighting factor may be determined based on the location distance of the current sub-PU and a corresponding neighboring block. In another example, the weighting factor may also be determined based on the POC distance between the target reference picture and the reference picture associated with a corresponding neighboring block's motion vector before scaling. In yet another example, the weighting factor may be determined based on motion vector difference or consistency. For simplicity, all the weighting factors may also be set to 1.

Alternatively, different rules may be applied to sub-PUs within one PU. For example, the above rule may be applied, in addition, for sub-PUs located at the first row/first column, the weighting factors for motion vectors derived from temporal neighboring blocks are set to 0 while for the remaining blocks, the weighting factors for motion vectors derived from spatial neighboring blocks are set to 0.

It should be noted that in practice, the equations above may be implemented as it is, or simplified for easy implementation. For example, to avoid division or floating point operation, fixed point operation may be used to approximate the equation above. One instance is that to avoid divide by 3, one may instead choose to multiply with 43/128 to replace division operation with multiplication and bit-shift. Those variations in implementation should be considered covered under the same spirit of the techniques described herein. Alternatively, non-linear operation may be also applied to derive the motion vectors, such as median filter.

Even if the motion vector predictors of each sub-PU are available, the STMVP mode may still be reset to be unavailable for one PU. For example, once a motion vector predictor of each sub-PU is derived for a given PU, some availability checks are performed to determine if STMVP mode should be made available for the given PU. Such an operation is used to eliminate the cases where it is very unlikely for STMVP mode to be finally chosen for a given PU. When STMVP mode is not available, mode signaling does not include STMVP. In case that STMVP mode is implemented by inserting SMTVP in merge list, the merge list doesn't include this STMVP candidate when STMVP mode is determined to be not available. As a result, signaling overhead may be reduced.

Consider one PU partitioned into M sub-PUs. In one example, if N1 (N1⇐M) sub-PUs among the M sub-PUs have the same motion vector predictor (i.e., same motion vectors and same reference picture indices), STMVP is only made available when N1 is smaller than a threshold or the predictor is different from other motion vector predictors (with smaller merge index) in the merge list. In another example, if N2 (N2⇐M) sub-PUs under STMVP mode share the same motion vector predictors as corresponding sub-PUs under ATMVP, STMVP is only made available when N2 is smaller than another threshold. In one example of the techniques of this disclosure, both thresholds for N1 and N2 are set equal to M. If STMVP is available, the STMVP is inserted into merge list. The ATMVP process may be extended and STMVP may be inserted either before or after ATMVP. In one example, STMVP is inserted right after ATMVP in the merge list.

In accordance with the techniques described herein, POC-based pruning is introduced. As discussed above, the techniques described herein may have a higher pruning accuracy because the techniques may capture redundant MV candidates more precisely by considering POC value. Also, POC-based pruning is universal in the sense that it may be applied to any pair of MVs to determine their uniqueness.

This section presents an example about how POC-based pruning may be applied to the merge candidate list in HM16.6-based JEM1.0m which is the reference software for the evaluation of next generation video codec. Owing to versatility of the proposed pruning, POC-based pruning may easily be applied to any merge MV candidate e.g. spatial candidates, sub-PU candidates (ATMVP and STMVP), TMVP, combined MV, and zero MV. Since HM16.6-based JEM1.0 does not apply any meaningful pruning for combi-MV and zero MV candidates, this example also presents how to apply POC-based pruning.

Note that POC-based pruning is not limited to merge candidates, and may be easily extended to other MV pruning, such as AMVP candidates and bi-directionally predicted MV construction. Furthermore, in this example, some features of POC-based pruning discussed above are omitted for simplicity.

Figure 11:
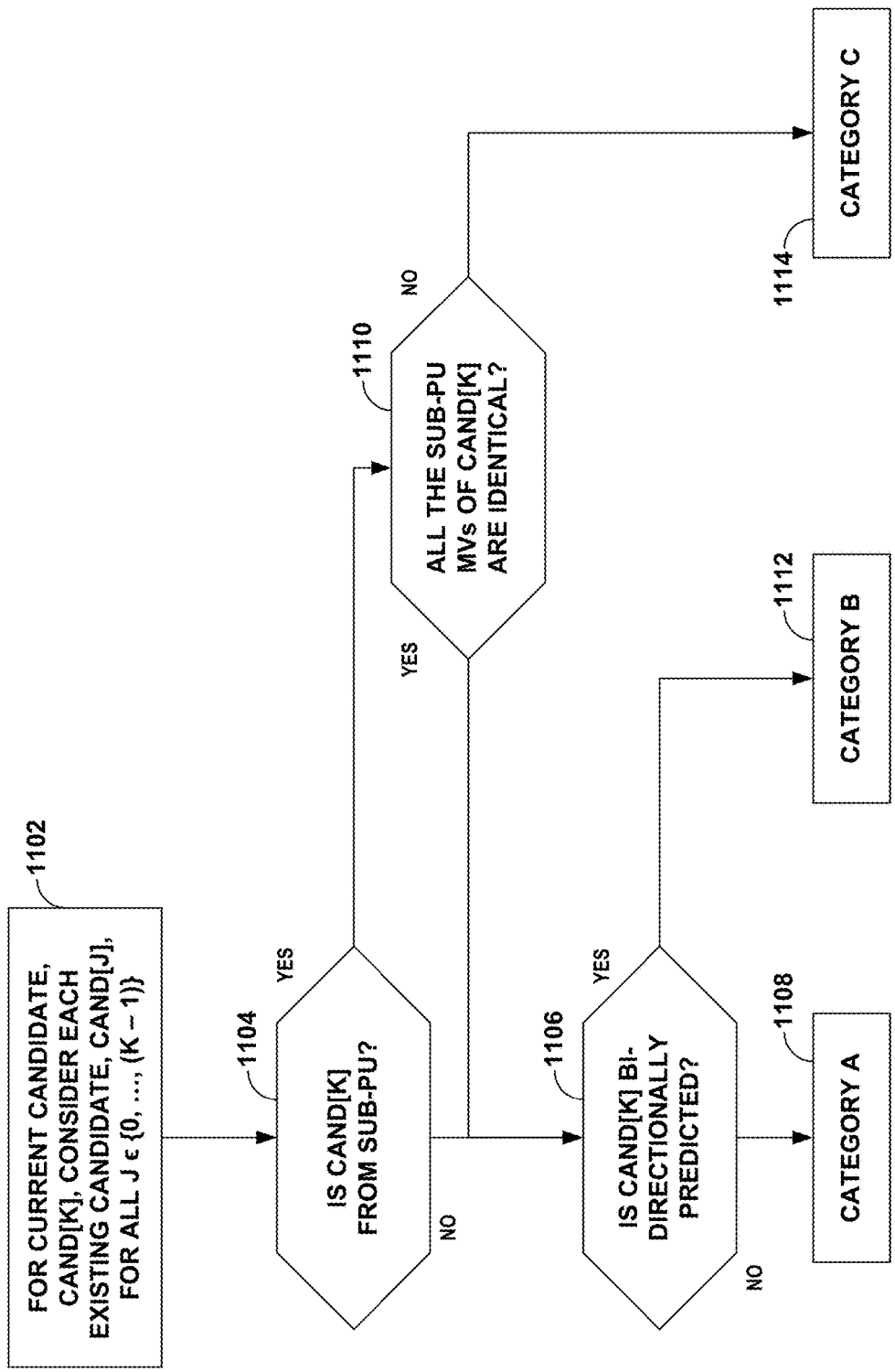
FIG. 11 is a flowchart illustrating the sorting of motion vectors into one of three categories for picture order count based pruning, in accordance with one or more techniques of the current disclosure.

FIG. 11 is a flowchart illustrating the sorting of motion vectors into one of three categories for picture order count based pruning, in accordance with one or more techniques of the current disclosure. The method of FIG. 11 may be performed by video encoder 20 and/or video decoder 30. For generality, the method of FIG. 11 is explained as being performed by a "video coder," which again, may correspond to either of video encoder 20 or video decoder 30 and, specifically, motion compensation unit 44 of video encoder 20 and motion compensation unit 72 of video decoder 30.

Conventional pruning processes such as those in H.264 or HEVC depend on motion vectors and reference indices no matter what pictures belong to the reference lists. Therefore, conventional pruning cannot prune MV candidates especially when L0 and L1 have the same reference pictures, i.e. same POC, because the video coder does not consider POC value. Techniques described herein present POC-based pruning to remove redundant MV candidates that have been considered as valid candidates by conventional pruning.

In this example, for an input (current) candidate, cand[k] (1102), a video coder (such as video encoder 20 or video decoder 30), for a current candidate cand[k], considers each existing candidate, cand[j], for every j∈{0, . . . , (k−1)} (1102). FIG. 11 shows three categories where POC-based pruning may be applied: Category A (1108), B (1112), and C (1114). In determining which category cand[k] belongs to, the video coder determines whether cand[k] is from a sub-PU (1104). If cand[k] is from a sub-PU ("YES" branch of 1104), the video coder then determines whether each sub-PU motion vector of cand[k] is identical (1110). If the video coder determines that not every sub-PU motion vector of cand[k] is identical ("NO" branch of 1110), then the video coder determines that cand[k] belongs to Category C.

If, however, the video coder determines that cand[k] is not from a sub-PU ("NO" branch of 1104) or the video coder determines that every sub-PU motion vector of cand[k] is identical ("YES" branch of 1110), the video coder (e.g., video encoder 20 or video decoder 30) then determines whether cand[k] is bi-directionally predicted (1106). The video coder determines that cand[k] belongs to category A (1108) when cand[k] is not bi-directionally predicted ("NO" branch of 1106). On the other hand, the video coder determines that cand[K] belongs to category B (1112) when cand[K] is bi-directionally predicted ("YES" branch of 1106).

Any MV candidate belongs to one of those categories and the video coder (e.g., video encoder 20 or video decoder 30) separates each category by the conditions in Table 2. Note that, for simplicity, POC-based pruning is omitted when examining if all the sub-PU MV's of cand[k] are identical.

TABLE 2

Three categories that POC-based pruning is applied for merge candidate list.

| Category | |
|---|---|
| Category A (1108) | Current candidate, cand[k], is not derived from sub-PUs OR is derived from sub-PUs but all the MVs in sub-PUs are identical AND Uni-directionally predicted. |
| Category B (1112) | Current candidate, cand[k], is not derived from sub-PUs OR is derived from sub-PUs but all the MVs in sub-PUs are identical AND Bi-directionally predicted. |
| Category C (1114) | Current candidate, cand[k], is derived from sub-PUs AND all the MVs in sub-PUs are NOT identical |

For each of the three categories, the video coder considers POC value during the pruning process under different conditions. In short, the video coder handles each category using associated pruning condition(s), e.g., Condition A for Category A and Condition B-1 and B-2 for Category B. FIG. 12 illustrates the flow chart of POC-based pruning on MV candidates.

FIG. 12 is a flowchart illustrating conditions for pruning each of the three categories described in FIG. 11, in accordance with one or more techniques of the current disclosure. The method of FIG. 12 may be performed by video encoder 20 and/or video decoder 30. For generality, the method of FIG. 12 is explained as being performed by a "video coder," which again, may correspond to either of video encoder 20 or video decoder 30 and, specifically, motion compensation unit 44 of video encoder 20 and motion compensation unit 72 of video decoder 30.

In this example, for an input (current) candidate, cand[k], a video coder (such as video encoder 20 or video decoder 30), for a current candidate cand[k], considers each existing candidate, cand[j], for every j∈{0, . . . , (k−1)} (1202). In Category A (1204), for the current MV candidate, cand[k], either (a) the video coder does not derive cand[k] by sub-PU approaches or (b) the video coder determines that all the MVs in sub-PUs are identical (refer to Category C description for more details). Also, the MV is uni-directionally predicted. Thus, the video coder computes MV[I] and POC [I] for all I∈{j, k} (1206). For a pair of (MV, POC) from a candidate, the video coder compares the pair from another candidate (1208) and, if they are identical ("YES" branch of 1208) (Condition A in Table 3), the video coder determines to prune the current MV (1222).

Note that POC-based pruning is not limited by either reference list (L0 or L1) or reference index. For example, even though MV[0] is derived from L0 but MV[1] from L1, in performing, POC-based pruning, the video coder checks the POC values of corresponding reference pictures and determines if they are identical.

Category B (1210) candidates are associated with the same condition with Category A except that the video coder bi-directionally derives MV. In Category B, the video coder derives four pairs of (MV, POC) and each two pairs come from each candidate: one from the reference list 0 and another from the list 1. The video coder then sorts two pairs of (MV, POC) from the same candidate such that POC[i][0] is less than POC[i][1] for all i∈{j, k} (1212). The video coder checks the available four pairs of (MV, POC) by two cascaded conditions: a pair-wise equality condition (1214) (condition B-1 in Table 3) and a cross equality condition (1216) (condition B-2 in Table 3) as below. If the video coder determines that either one of the conditions are satisfied ("YES" branch of either 1214 or 1216), the video coder identifies the current candidate as redundant and the video coder prunes the candidate from the candidate list (1222).

Related to Category C (1218), the video coder derives sub-PU MV candidates. Since more than one sub-PU MV candidates may exist in the candidate list, the video coder applies POC-based pruning to two cases:
1. sub-PU MV vs. sub-PU MV within a PU.
2. sub-PU MVs in a PU vs. sub-PU MVs in another PU.

For the first case, the video coder determines if sub-PU MVs in a PU are all identical (1110 of FIG. 11). If identical, sub-PU MVs are represented by a single MV for the PU and the sub-PU fits into Category A or Category B. For the second case, the video coder compares two sub-PU MV candidates by one-to-one comparisons of a pair of sub-PU MVs located at the same position within the PUs (1220), that is, Condition C in Table 3, which is a combination of Condition A and Condition B-1/2. The video coder determines which condition to apply by the characteristics of corresponding sub-PUs in the comparison, e.g., applying Condition A for a pair of sub-PUs under Category A.

TABLE 3

Example of conditions to be applied to corresponding categories in Table 2.

| Condition A (1208) | POC[j] == POC[k] AND MV[j] == MV[k] |
|---|---|
| Condition B-1 (1214) | POC[j][0] == POC[k][0] AND POC[j][1] == POC[k][1] AND MV[j][0] == MV[k][0] AND MV[j][1] == MV[k][1] |
| Condition B-2 (1216) | POC[j][0] == POC[k][0] AND POC[j][1] == POC[k][1] AND POC[j][0] == POC[j][1] AND MV[j][0] == MV[k][1] AND MV[j][1] == MV[k][0] |
| Condition C (1218) | Condition A or Condition B-1/2 depending on target sub-PU MV's category. |

For pruning combined MV candidates, the video coder constructs combined MV candidates from a pair of MV candidates already in the merge list. In the latest HEVC (HM16.6), the video coder may use up to 4 existing merge candidates (12 combinations in total) to derive the combined MVs. The video coder constructs a combined MV using two MV candidates: the first candidate referring to a picture in the list L0 and the second candidate referring to a picture in the list L1. The video coder inserts the derived MV candidate into the list unless the reference pictures and MVs of the two candidates are identical. However, the video coder does not compare the derived MV candidate to existing candidates in the merge list before the insertion.

In this example, the video coder applies POC-based pruning once the derived MV candidate available. More specifically, this situation falls into Category B because the video coder bi-directionally predicts combined MV candidates. As described above, the video coder applies both condition B-1 and B-2 and, if either of the conditions are satisfied, the video coder prunes the combined MV candidate by taking into account POC value.

For pruning zero MV candidates, in HEVC, the video coder inserts zero motion vectors into the merge candidate list in the order of reference index starting from zero until the list is complete. In other words, identical zero MVs may exist in the list even though other unique zero MVs are available. In the worst case, the video coder inserts zero MVs with smaller reference indices even if they are redundant with existing candidates, while the remaining zero MVs with larger reference indices cannot be added even though they are unique because the list is already complete.

Instead of blind insertion of zero MVs to the merge list, this example presents a way for the video coder to prune zero MVs by introducing a POC-based redundancy check of zero MVs. In performing the pruning process, the video coder increases diversity of the merge list by introducing more unique MV candidates, which may lead to more efficient MV prediction.

The video coder inserts a zero MV into the merge list if the zero MV does not exist in the list, and the current number of merge candidates is less than the maximum number of merge candidates. Otherwise, the video coder skips the zero MV and goes to the next available zero MV by increasing reference index by 1, e.g. for B-slice, both reference indices in L0 and L1 reference list increases simultaneously. If the reference index is beyond the available reference index, the video coder sets the reference index to zero. The video coder iterates this procedure iterates until the merge list is filled with the maximum number of merge candidates.

Given that curMergeCandNum is the current number of merge candidates in the list and less than the maximum number of merge candidates, set r=0, refCnt=0, and bRunFlag=0, the video coder sets maxRefIdx as the minimum number of available reference index in L0 and L1 if current picture is in B slice. Otherwise, the video coder may set maxRefIdx as the number of available reference index in L0.

If the video coder does not include the zero MV candidate, with MV equal to (0, 0) and refIdx equal to r, in the merge candidate list (i.e., there is no candidate in the candidate list that has the MV equal to (0, 0) and POC value of its associated reference picture is not equal to the POC value of the reference picture with refIdx equal to r) or bRunFlag is equal to 1, the video coder adds the zero-mv to the merge list and increases curMergeCandNum by 1. The video coder also increases both r and refCnt by 1. If refCnt is equal to (maxRefIdx−1), the video coder sets r=0 and sets bRunFlag=1. The video coder repeats these steps until curMergeCandNum is equal to maximum number of merge candidates.

Alternatively, for a B-slice, the video coder does not necessarily increase reference indices in L0 and L1 simultaneously. For example, instead of resetting r to zero for both L0 and L1 lists above, the video coder may only increase the reference index in only one of the lists to increase diversity of zero MV. In other instances, the video coder may combine different offsets for different lists and examine the redundancy of those zero MV by the proposed POC-based pruning without any modification.

FIG. 13 is a flowchart illustrating an example method for pruning motion vectors based on picture order count values in accordance with the techniques of this disclosure. The method of FIG. 13 may be performed by video encoder 20 and/or video decoder 30. For generality, the method of FIG. 13 is explained as being performed by a "video coder," which again, may correspond to either of video encoder 20 or video decoder 30 and, specifically, motion compensation unit 44 of video encoder 20 and motion compensation unit 72 of video decoder 30.

Motion estimation unit 42 of video encoder 20 and motion compensation unit 44 may be highly integrated. If the techniques of this disclosure are performed in an encoding loop of the video coding process, prior to motion compensation unit 44 performing the techniques described herein, motion estimation unit 42 may perform motion estimation, or the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

In accordance with techniques of the current disclosure, the video coder may be configured to code a motion vector. In coding the motion vector, the video coder may be configured to generate a list of motion vector prediction candidates for a prediction unit (PU) of video data (1302). The video coder may be further configured to prune a first motion vector prediction candidate from the list of motion vector prediction candidates when a first picture order count (POC) value for a reference picture identified by the first motion vector prediction candidate is equal to a second POC value of a reference picture identified by a second motion vector prediction candidate in the list of motion vector prediction candidates (1304). The video coder may also be configured to code (e.g., decode or encode) the PU using the pruned list (1306).

In some examples, in pruning the list of motion vector prediction candidates, the video coder may determine that the first POC value is equal to the second POC value. The video coder may further determine that a first motion vector prediction candidate is equal to a second motion vector of the second motion vector prediction candidate. In response to determining that the first POC value is equal to the second POC value and that the first motion vector is equal to the second motion vector, the video coder may remove the first motion vector prediction candidate from the list of motion vector prediction candidates.

In some examples, the video coder may derive a first motion vector of the first motion vector prediction candidate from a first reference picture list. The video coder may also derive a second motion vector of the second motion vector prediction candidate from second reference picture list. The first reference picture list may be different than the second reference picture list. For instance, as described above, various prediction modes may use both list L0 and list L1. In accordance with the techniques described herein, one of the two motion vector prediction candidates may include a motion vector derived from list L0, and the second motion vector prediction candidate may include a motion vector derived from list L1. In some instances, the first motion vector prediction candidate and the second motion vector prediction candidate may be motion vectors of a sub-prediction unit (sub-PU) of the PU.

In some instances, the first motion vector prediction candidate and the second motion vector prediction candidate are uni-directional motion vector prediction candidates. In other instances, wherein the first motion vector prediction candidate and the second motion vector prediction candidate are bi-directional motion vector prediction candidates. In instances where the motion vector prediction candidates are bi-directional motion vector prediction candidates, the first POC value is for a first reference picture identified by the first motion vector prediction candidate. The first motion vector prediction candidate further includes a first motion vector. Further, the second POC value is for a second reference picture identified by the second motion vector prediction candidate. The second motion vector prediction candidate further includes a second motion vector. As the motion vector prediction candidates are bi-directional, the first motion vector prediction candidate further includes a third motion vector and a third reference picture with a third POC value, the second motion vector prediction candidate further includes a fourth motion vector and a fourth reference picture with a fourth POC value.

In some examples where the motion vector prediction candidates are bi-directional, the process of pruning the first motion vector prediction candidate may include the video coder determining that the first POC value is equal to the second POC value. The video coder may further determine that the first motion vector of the first motion vector prediction candidate is equal to the second motion vector of the second motion vector prediction candidate. The video coder may further determine that the third POC value is equal to the fourth POC value and that the third motion vector of the first motion vector prediction candidate is equal to the fourth motion vector of the second motion vector prediction candidate. In other words, the video coder may determine that a respective direction of the respective bi-directional motion vector prediction candidates have a matching POC value and a matching motion vector in the corresponding bi-directional motion vector prediction candidate in a pairwise equality. In response to determining that the first POC value is equal to the second POC value, the first motion vector is equal to the second motion vector, the third POC value is equal to the fourth POC value, and the third motion vector is equal to the fourth motion vector, the video coder may remove the first motion vector prediction candidate from the list of motion vector prediction candidates.

In other examples where the motion vector prediction candidates are bi-directional, the process of pruning the first motion vector prediction candidate may include the video coder determining that the first POC value is equal to the second POC value. The video coder may further determine that the first motion vector of the first motion vector prediction candidate is equal to the fourth motion vector of the second motion vector prediction candidate. The video coder may further determine that the third POC value is equal to the fourth POC value and that the third motion vector of the first motion vector prediction candidate is equal to the second motion vector of the second motion vector prediction candidate. In other words, the video coder may determine that a respective direction of the respective bi-directional motion vector prediction candidates have a matching POC value and a matching motion vector in the corresponding bi-directional motion vector prediction candidate in a cross equality condition. In response to determining that the first POC value is equal to the second POC value, the first motion vector is equal to the fourth motion vector, the third POC value is equal to the fourth POC value, the first POC value is equal to the third POC value, and the second motion vector is equal to the third motion vector, the video coder may remove the first motion vector prediction candidate from the list of motion vector prediction candidates.

If the techniques of this disclosure are performed in an decoding loop of the video coding process, after motion compensation unit 44 performs the techniques described herein, inverse quantization unit 76 inverse quantizes, i.e., de-quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device.

It is to be recognized that depending on the example, certain acts or events of any of the techniques described herein may be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

By way of example, and not limitation, such computer-readable storage media may comprise RAM, ROM, EEPROM, CD-ROM or other optical disk storage, magnetic disk storage, or other magnetic storage devices, flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method of decoding video data, the method comprising:
    generating a list of motion vector prediction candidates for a prediction unit (PU) of video data, wherein a first motion vector prediction candidate and a second motion vector prediction candidate from the list of motion vector prediction candidates are bi-directional motion vector prediction candidates;
    determining, for the first motion vector prediction candidate from the list of motion vector prediction candidates, a first picture order count (POC) value for a first reference picture identified by the first motion vector prediction candidate;
    determining, for the second motion vector prediction candidate from the list of motion vector prediction candidates, a second POC value for a second reference picture identified by the second motion vector prediction candidate;
    determining, for the first motion vector prediction candidate, a third POC value for a third reference picture identified by the first motion vector prediction candidate;
    determining, for the second motion vector prediction candidate, a fourth POC value for a fourth reference picture identified by the second motion vector prediction candidate;
    at least one of determining that a pair-wise equality condition is satisfied by the first motion vector prediction candidate and the second motion vector prediction candidate or determining that a cross-equality condition is satisfied by the first motion vector prediction candidate and the second motion vector prediction candidate,
    wherein determining that the pair-wise equality condition is satisfied comprises:
        determining that the first POC value is equal to the second POC value;
        determining that a first motion vector of the first motion vector prediction candidate is equal to a first motion vector of the second motion vector prediction candidate;
        determining that the third POC value is equal to the fourth POC value;
        determining that a second motion vector of the first motion vector prediction candidate is equal to a second motion vector of the second motion vector prediction candidate; and
        in response to determining that the first POC value is equal to the second POC value, the first motion vector of the first motion vector prediction candidate is equal to the first motion vector of the second motion vector prediction candidate, the third POC value is equal to the fourth POC value, and the second motion vector of the first motion vector prediction candidate is equal to the second motion vector of the second motion vector prediction candidate, determining that the pair-wise equality condition is satisfied, and
    wherein determining that the cross-equality condition is satisfied comprises:
        determining that the first POC value is equal to the second POC value;
        determining that the first motion vector of the first motion vector prediction candidate is equal to the second motion vector of the second motion vector prediction candidate;
        determining that the third POC value is equal to the fourth POC value;
        determining that the second motion vector of the first motion vector prediction candidate is equal to the first motion vector of the second motion vector prediction candidate; and in response to determining that the first POC value is equal to the second POC value, the first motion vector of the first motion vector prediction candidate is equal to the second motion vector of the second motion vector prediction candidate, the third POC value is equal to the fourth POC value, and the second motion vector of the first motion vector prediction candidate is equal to the first motion vector of the second motion vector prediction candidate, determining that the cross-equality condition is satisfied;

in response to determining that one of the pair-wise equality condition or the cross-equality condition is satisfied by the first motion vector prediction candidate and the second motion vector prediction candidate, pruning the first motion vector prediction candidate from the list of motion vector prediction candidates to create a pruned list; and decoding the PU using the pruned list.

2. The method of claim 1, further comprising deriving the first motion vector of the first motion vector prediction candidate from a first reference picture list, and deriving the first motion vector of the second motion vector prediction candidate from a second reference picture list, and wherein the first reference picture list is different than the second reference picture list.

3. The method of claim 1, wherein the first motion vector prediction candidate and the second motion vector prediction candidate are motion vector prediction candidates of a sub-prediction unit (sub-PU) of the PU.

4. A video coding device comprising:
a memory configured to store video data; and
one or more processors implemented in circuitry and configured to:
generate a list of motion vector prediction candidates for a prediction unit (PU) of video data, wherein a first motion vector prediction candidate and a second motion vector prediction candidate from the list of motion vector prediction candidates are bi-directional motion vector prediction candidates;
determine, for the first motion vector prediction candidate from the list of motion vector prediction candidates, a first picture order count (POC) value for a first reference picture identified by the first motion vector prediction candidate;
determine, for the second motion vector prediction candidate from the list of motion vector prediction candidates, a second POC value for a second reference picture identified by the second motion vector prediction candidate;
determine, for the first motion vector prediction candidate, a third POC value for a third reference picture identified by the first motion vector prediction candidate;
determine, for the second motion vector prediction candidate, a fourth POC value for a fourth reference picture identified by the second motion vector prediction candidate;
at least one of determine that a pair-wise equality condition is satisfied by the first motion vector prediction candidate and the second motion vector prediction candidate or determine that a cross-equality condition is satisfied by the first motion vector prediction candidate and the second motion vector prediction candidate, wherein the one or more processors being configured to determine that the pair-wise equality condition is satisfied comprises the one or more processors being configured to:
determine that the first POC value is equal to the second POC value;
determine that a first motion vector of the first motion vector prediction candidate is equal to a first motion vector of the second motion vector prediction candidate;
determine that the third POC value is equal to the fourth POC value;
determine that a second motion vector of the first motion vector prediction candidate is equal to a second motion vector of the second motion vector prediction candidate; and
in response to determining that the first POC value is equal to the second POC value, the first motion vector of the first motion vector prediction candidate is equal to the first motion vector of the second motion vector prediction candidate, the third POC value is equal to the fourth POC value, and the second motion vector of the first motion vector prediction candidate is equal to the second motion vector of the second motion vector prediction candidate, determine that the pair-wise equality condition is satisfied, and wherein the one or more processors being configured to determine that the cross-equality condition is satisfied comprises the one or more processors being configured to:
determine that the first POC value is equal to the second POC value;
determine that the first motion vector of the first motion vector prediction candidate is equal to the second motion vector of the second motion vector prediction candidate;
determine that the third POC value is equal to the fourth POC value;
determine that the second motion vector of the first motion vector prediction candidate is equal to the first motion vector of the second motion vector prediction candidate; and
in response to determining that the first POC value is equal to the second POC value, the first motion vector of the first motion vector prediction candidate is equal to the second motion vector of the second motion vector prediction candidate, the third POC value is equal to the fourth POC value, and the second motion vector of the first motion vector prediction candidate is equal to the first motion vector of the second motion vector prediction candidate, determine that the cross-equality condition is satisfied;

in response to determining that one of the pair-wise equality condition or the cross-equality condition is satisfied by the first motion vector prediction candidate and the second motion vector prediction candidate, prune the first motion vector prediction candidate from the list of motion vector prediction candidates to create a pruned list; and
code the PU using the pruned list.

5. The video coding device of claim 4, wherein the one or more processors are further configured to:
derive the first motion vector of the first motion vector prediction candidate from a first reference picture list; and derive the first motion vector of the second motion vector prediction candidate from a second reference picture list, and wherein the first reference picture list is different than the second reference picture list.

6. The video coding device of claim 4, wherein the first motion vector prediction candidate and the second motion vector prediction candidate are motion vector prediction candidates of a sub-prediction unit (sub-PU) of the PU.

7. The video coding device of claim 4, wherein the video coding device comprises a video decoder, and wherein the one or more processors being configured to code the PU using the pruned list comprises the one or more processors being configured to decode the PU using the pruned list.

8. The video coding device of claim 4, wherein the video coding device comprises a video encoder, and wherein the one or more processors being configured to code the PU using the pruned list comprises the one or more processors being configured to decode the PU using the pruned list.

9. A non-transitory computer-readable storage medium having stored thereon instructions that, when executed, cause one or more processors of a video coding device to:
   generate a list of motion vector prediction candidates for a prediction unit (PU) of video data, wherein a first motion vector prediction candidate and a second motion vector prediction candidate from the list of motion vector prediction candidates are bi-directional motion vector prediction candidates;
   determine, for the first motion vector prediction candidate from the list of motion vector prediction candidates, a first picture order count (POC) value for a first reference picture identified by the first motion vector prediction candidate;
   determine, for the second motion vector prediction candidate from the list of motion vector prediction candidates, a second POC value for a second reference picture identified by the second motion vector prediction candidate;
   determine, for the first motion vector prediction candidate, a third POC value for a third reference picture identified by the first motion vector prediction candidate;
   determine, for the second motion vector prediction candidate, a fourth POC value for a fourth reference picture identified by the second motion vector prediction candidate;
   at least one of determine that a pair-wise equality condition is satisfied by the first motion vector prediction candidate and the second motion vector prediction candidate or determine that a cross-equality condition is satisfied by the first motion vector prediction candidate and the second motion vector prediction candidate,
   wherein the instructions that cause the one or more processors to determine that the pair-wise equality condition is satisfied comprises instructions that, when executed, cause the one or more processors to:
      determine that the first POC value is equal to the second POC value;
      determine that a first motion vector of the first motion vector prediction candidate is equal to a first motion vector of the second motion vector prediction candidate;
      determine that the third POC value is equal to the fourth POC value;
      determine that a second motion vector of the first motion vector prediction candidate is equal to a second motion vector of the second motion vector prediction candidate; and
      in response to determining that the first POC value is equal to the second POC value, the first motion vector of the first motion vector prediction candidate is equal to the first motion vector of the second motion vector prediction candidate, the third POC value is equal to the fourth POC value, and the second motion vector of the first motion vector prediction candidate is equal to the second motion vector of the second motion vector prediction candidate, determine that the pair-wise equality condition is satisfied, and
   wherein the instructions that cause the one or more processors to determine that the cross-equality condition is satisfied comprises instructions that, when executed, cause the one or more processors to:
      determine that the first POC value is equal to the second POC value;
      determine that the first motion vector of the first motion vector prediction candidate is equal to the second motion vector of the second motion vector prediction candidate;
      determine that the third POC value is equal to the fourth POC value;
      determine that the second motion vector of the first motion vector prediction candidate is equal to the first motion vector of the second motion vector prediction candidate; and
      in response to determining that the first POC value is equal to the second POC value, the first motion vector of the first motion vector prediction candidate is equal to the second motion vector of the second motion vector prediction candidate, the third POC value is equal to the fourth POC value, and the second motion vector of the first motion vector prediction candidate is equal to the first motion vector of the second motion vector prediction candidate, determine that the cross-equality condition is satisfied;
   in response to determining that one of the pair-wise equality condition or the cross-equality condition is satisfied by the first motion vector prediction candidate and the second motion vector prediction candidate, prune the first motion vector prediction candidate from the list of motion vector prediction candidates to create a pruned list; and
   code the PU using the pruned list.

10. The non-transitory computer-readable storage medium of claim 9, wherein the video coding device comprises a video decoder, and wherein the instructions that cause the one or more processors to code the PU using the pruned list comprise instructions that, when executed, cause the one or more processors to decode the PU using the pruned list.

11. The non-transitory computer-readable storage medium of claim 9, wherein the video coding device comprises a video encoder, and wherein the instructions that cause the one or more processors to code the PU using the pruned list comprise instructions that, when executed, cause the one or more processors to encode the PU using the pruned list.

12. The non-transitory computer-readable storage medium of claim 9, wherein the first motion vector prediction candidate and the second motion vector prediction candidate are motion vector prediction candidates of a sub-prediction unit (sub-PU) of the PU.

13. An apparatus for decoding video data, the apparatus comprising:

means for generating a list of motion vector prediction candidates for a prediction unit (PU) of video data, wherein a first motion vector prediction candidate and a second motion vector prediction candidate from the list of motion vector prediction candidates are bi-directional motion vector prediction candidates;

means for determining, for the first motion vector prediction candidate from the list of motion vector prediction candidates, a first picture order count (POC) value for a first reference picture identified by the first motion vector prediction candidate;

means for determining, for the second motion vector prediction candidate from the list of motion vector prediction candidates, a second POC value for a second reference picture identified by the second motion vector prediction candidate;

means for determining, for the first motion vector prediction candidate, a third POC value for a third reference picture identified by the first motion vector prediction candidate;

means for determining, for the second motion vector prediction candidate, a fourth POC value for a fourth reference picture identified by the second motion vector prediction candidate;

at least one of means for determining that a pair-wise equality condition is satisfied by the first motion vector prediction candidate and the second motion vector prediction candidate or means for determining that a cross-equality condition is satisfied by the first motion vector prediction candidate and the second motion vector prediction candidate, wherein the means for determining that the pair-wise equality condition is satisfied comprises:
  means for determining that the first POC value is equal to the second POC value;
  means for determining that a first motion vector of the first motion vector prediction candidate is equal to a first motion vector of the second motion vector prediction candidate;
  means for determining that the third POC value is equal to the fourth POC value;
  means for determining that a second motion vector of the first motion vector prediction candidate is equal to a second motion vector of the second motion vector prediction candidate; and
  means for determining that the pair-wise equality condition is satisfied in response to determining that the first POC value is equal to the second POC value, the first motion vector of the first motion vector prediction candidate is equal to the first motion vector of the second motion vector prediction candidate, the third POC value is equal to the fourth POC value, and the second motion vector of the first motion vector prediction candidate is equal to the second motion vector of the second motion vector prediction candidate, and wherein the means for determining that the cross-equality condition is satisfied comprises:
  means for determining that the first POC value is equal to the second POC value;
  means for determining that the first motion vector of the first motion vector prediction candidate is equal to the second motion vector of the second motion vector prediction candidate;
  means for determining that the third POC value is equal to the fourth POC value;
  means for determining that the second motion vector of the first motion vector prediction candidate is equal to the first motion vector of the second motion vector prediction candidate; and
  means for determining that the cross-equality condition is satisfied in response to determining that the first POC value is equal to the second POC value, the first motion vector of the first motion vector prediction candidate is equal to the second motion vector of the second motion vector prediction candidate, the third POC value is equal to the fourth POC value, and the second motion vector of the first motion vector prediction candidate is equal to the first motion vector of the second motion vector prediction candidate;

means for pruning the first motion vector prediction candidate from the list of motion vector prediction candidates to create a pruned list in response to determining that one of the pair-wise equality condition or the cross-equality condition is satisfied by the first motion vector prediction candidate and the second motion vector prediction candidate; and means for decoding the PU using the pruned list.

14. The apparatus of claim 13, further comprising means for deriving the first motion vector of the first motion vector prediction candidate from a first reference picture list, and means for deriving the first motion vector of the second motion vector prediction candidate from a second reference picture list, and wherein the first reference picture list is different than the second reference picture list.

15. The apparatus of claim 13, wherein the first motion vector prediction candidate and the second motion vector prediction candidate are motion vector prediction candidates of a sub-prediction unit (sub-PU) of the PU.

16. The non-transitory computer-readable storage medium of claim 9, wherein the instructions, when executed, further cause the one or more processors to:
  derive the first motion vector of the first motion vector prediction candidate from a first reference picture list; and
  derive the first motion vector of the second motion vector prediction candidate from a second reference picture list, and wherein the first reference picture list is different than the second reference picture list.

\* \* \* \* \*